US010669160B2

(12) United States Patent
Liu et al.

(10) Patent No.: US 10,669,160 B2
(45) Date of Patent: Jun. 2, 2020

(54) HETEROGENEOUS WET SYNTHESIS PROCESS FOR PREPARATION OF HIGH PURITY TUNGSTEN PENTAHALIDE

(71) Applicants: L'Air Liquide, Société Anonyme pour l'Etude et l'Exploitation des Procédés Georges Claude, Paris (FR); American Air Liquide, Inc., Fremont, CA (US)

(72) Inventors: Yumin Liu, San Jose, CA (US); Feng Li, San Jose, CA (US); Zhiwen Wan, Plano, TX (US); Claudia Fafard, Newark, DE (US); Stefan Wiese, San Jose, CA (US); Guillaume Husson, Newark, DE (US); Grigory Nikiforov, Bridgewater, NJ (US); Bin Sui, Houston, TX (US); Jean-Marc Girard, Versailles (FR)

(73) Assignees: L'Air Liquide, Société Anonyme pour l'Etude et l'Exploitation des Procédés Georges Claude, Paris (FR); American Air Liquide, Inc., Fremont, CA (US)

( * ) Notice: Subject to any disclaimer, the term of this patent is extended or adjusted under 35 U.S.C. 154(b) by 96 days.

(21) Appl. No.: 15/966,799

(22) Filed: Apr. 30, 2018

(65) Prior Publication Data
US 2019/0330076 A1    Oct. 31, 2019

(51) Int. Cl.
*C01G 41/04*    (2006.01)
(52) U.S. Cl.
CPC .................................. *C01G 41/04* (2013.01)
(58) Field of Classification Search
CPC ............................... C01G 41/00; C01G 41/04
See application file for complete search history.

(56) References Cited

U.S. PATENT DOCUMENTS

| 8,372,177 B1 | 2/2013 | Thoma et al. |
| 9,449,843 B1 | 9/2016 | Korolik et al. |
| 9,595,466 B2 | 3/2017 | Fu et al. |
| 2009/0014879 A1 | 1/2009 | Park et al. |
| 2014/0120723 A1 | 5/2014 | Fu et al. |
| 2016/0305020 A1 | 10/2016 | Wu et al. |
| 2019/0031526 A1 | 1/2019 | Takahashi et al. |

FOREIGN PATENT DOCUMENTS

WO    WO 2017 130745    8/2017

OTHER PUBLICATIONS

Brisdon, A.K. et al., Spectroscopic studies on matrix isolated tungsten chlorides and bromides, Journal of the Chemical Society, Dalton Transactions, 1989, No. 2, 313-316.
International Search Report and Written Opinion for corresponding PCT/US2019/029958, dated Aug. 13, 2019.
Brown, T.M. et al., "An improved method for the preparation of tungsten pentachloride and molybdenum tetrachloride," Inorganic Chemistry, vol. 7, No. 6, Jun. 1968, 1227-1229.

(Continued)

*Primary Examiner* — Ngoc-Yen Nguyen
(74) *Attorney, Agent, or Firm* — Patricia E. McQueeney; Allen E. White

(57) ABSTRACT

Synthesis of tungsten pentahalide compositions having low impurity profiles are disclosed. The specific impurity profile permits deposition of high purity tungsten-containing films using vapor deposition processes or other semiconductor manufacturing processes without introduction of performance-impacting contaminants.

18 Claims, 8 Drawing Sheets

(56) References Cited

OTHER PUBLICATIONS

Thorn-Csanyi, E. et al., "A new route to the preparation of tungsten pentachloride," J. of Molecular Catalysis, 65 (1991) 261-267.
Traven, V.F. et al., "Reaction of polysilanes and their Group IVB analogs with tungsten hexachloride and molybdenum pentachloride," English translation of Izvestiya Akademii Nauk SSSR, Seriya Khimicheskaya, 7 (1975) 1681.

US 10,669,160 B2

HETEROGENEOUS WET SYNTHESIS PROCESS FOR PREPARATION OF HIGH PURITY TUNGSTEN PENTAHALIDE

TECHNICAL FIELD

Synthesis of tungsten pentahalide compositions having low impurity profiles are disclosed. The specific impurity profile permits deposition of high purity tungsten-containing films using vapor deposition processes or other semiconductor manufacturing processes without introduction of performance-impacting contaminants.

BACKGROUND

Tungsten pentachloride is a precursor used in semiconductor processing for deposition of Tungsten containing films or etching processes. Tungsten (W) metal is used as plugs to connect M1 to copper interconnects of the FEOL and BEOL in logic and memory applications. See, e.g., US2009/0014879 to Park et al. Tungsten (W) or tungsten silicide ($WSi_2$) may also serve as a metal gate deposited on Ti. See, e.g., US2014/0120723 to Fu et al. $WCl_5$ has also been used to selectively etch substrates, such as metals, metal nitrides, and metal oxides. See, e.g., U.S. Pat. No. 9,449,843 to Korolik et al. and U.S. Pat. No. 9,595,466 to Fu et al.

Traven et al. disclose reactions of polysilanes and their Group IVB analogs with tungsten hexachloride. Izvestiya Akademii Nauk SSSR, Seriya Khimicheskaya (1975) 7, p. 1681.

Thorn-Csanyi et al. disclose reaction between $WCl_6$ and olefins to show that the reduction of $WCl_6$ with olefins is applicable to the preparation of $WCl_5$. J. Molecular Catalysis, 1991, 65, 261-67.

$WCl_6$ was reduced photolytically neat with tetrachloroethylene to produce hexachloroethane and $WCl_5$. Inorganic Chemistry, 1968, 7, 6, 1227-1229.

A need remains for inexpensive and commercially viable synthesis methods to produce tungsten halides having purity suitable for use in the semiconductor industry.

SUMMARY

Methods for synthesizing $WX_5$-containing compositions are disclosed, wherein X is Cl or Br. Tungsten hexahalide is reacted with an olefin in an aliphatic halohydrocarbon solvent to form a reaction mixture. The $WCl_5$-containing composition is isolated from the reaction mixture. The disclosed methods may include one or more of the following aspects:
- tungsten hexahalide being $WCl_6$;
- tungsten hexahalide being $WBr_6$;
- tungsten pentahalide being $WCl_5$;
- tungsten pentahalide being $WBr_5$;
- reacting the tungsten hexahalide with the olefin at a temperature ranging from approximately 10° C. to approximately 70° C.;
- reacting the tungsten hexahalide with the olefin at a temperature ranging from approximately 10° C. to approximately 28° C.;
- reacting the tungsten hexahalide with the olefin at a temperature ranging from approximately 15° C. to approximately 28° C.;
- maintaining a reaction temperature ranging from approximately 10° C. to approximately 70° C.;
- maintaining a reaction temperature ranging from approximately 10° C. to approximately 28° C.;
- maintaining a reaction temperature ranging from approximately 15° C. to approximately 28° C.;
- stirring the reaction mixture at a speed sufficient to maintain any solid reactant or product in suspension;
- stirring the reaction mixture for approximately 10 min to approximately 48 hours prior to the isolation step;
- stirring the reaction mixture for approximately 3 hours to approximately 18 hours prior to the isolation step;
- isolating the tungsten pentahalide from the reaction mixture by evaporating the aliphatic halohydrocarbon solvent to produce an isolated $WX_5$-containing composition;
- isolating the tungsten pentahalide from the reaction mixture by filtration to produce a filtered tungsten pentahalide to produce an isolated $WX_5$-containing composition;
- rinsing the isolated $WX_5$-containing composition with a rinse solvent to produce purified tungsten pentahalide;
- the aliphatic halohydrocarbon solvent being the same as the rinse solvent;
- the aliphatic halohydrocarbon solvent being different from the rinse solvent;
- sublimating the purified tungsten pentahalide;
- adding approximately 2 mL to approximately 20 mL of aliphatic halohydrocarbon solvent per approximately 1 g of tungsten halide;
- adding approximately 3 mL to approximately 10 mL of aliphatic halohydrocarbon solvent per approximately 1 g of tungsten halide;
- a molar ratio of the tungsten (VI) to the olefin being between 0.5:1 and 2.5:1;
- a molar ratio of the tungsten (VI) to the olefin being between 1:1 and 1.8:1;
- a molar ratio of the Tungsten (VI) to the olefin being between 0.5:1 and 1.5:1;
- the olefin being selected from the group consisting of cis/trans 2-pentene, 1-pentene, 1-hexene, 1,5-hexadiene, 2-methyl-1,3-butadiene, 2,3-dimethyl-2-butene, 3,3-dimethyl-1-butene, 4-methyl-1-pentene, cyclopentene, and combinations thereof;
- the olefin having the formula $C_nR_{2n}$, wherein each R is independently H or a C1-C4 hydrocarbyl group and n=4-11;
- the olefin being cis/trans 2-pentene;
- the olefin being 1-pentene;
- the olefin being 1-hexene;
- the olefin being 2,3-dimethyl-2-butene;
- the olefin being 3,3-dimethyl-1-butene;
- the olefin being 4-methyl-1-pentene;
- the olefin having the formula $C_nR_{2n-2}$, wherein each R is independently H or a C1-C4 hydrocarbyl group and n=4-11;
- the olefin being 1,5-hexadiene;
- the olefin being 2-methyl-1,3-butadiene;
- the olefin having the formula cyclic $C_nR_{2n-2}$, wherein each R is independently H or a C1-C4 hydrocarbyl group and n=4-11;
- the olefin being cyclopentene;
- the olefin having the formula cyclic $C_nR_{2n-4}$, wherein each R independently is H or a C1-C4 hydrocarbyl group and n=4, 5, or 7-11;
- the olefin having the formula cyclic $C_nR_{2n-6}$, wherein each R is independently H or a C1-C4 hydrocarbyl group and n=4-11;

the aliphatic halohydrocarbon solvent being selected from the group consisting of dichloromethane, 1,2-dichloroethane, trichlorofluoromethane, 1,1-dichloro-1-fluoroethane, 1-chloropropane, 1-chlorobutane, and combinations thereof;

the aliphatic halohydrocarbon solvent being selected from the group consisting of 1-chlorobutane, dichloromethane, chloroform, and combinations thereof;

the aliphatic halohydrocarbon solvent being 1-chlorobutane or dichloromethane;

the rinse solvent being selected from the group consisting of hydrocarbons, halo-hydrocarbons, and halocarbons;

the rinse solvent being selected from the group consisting of toluene, heptane, pentane, ethylbenzene, dichloroxylenes, 1-chlorobutane, dichloromethane, chloroform, and dichlorobenzene;

the rinse solvent being selected from halo-hydrocarbons or halocarbons;

the rinse solvent being selected from the group consisting of dichloroxylenes, 1-chlorobutane, dichloromethane, chloroform, and dichlorobenzene;

purifying the isolated Tungsten (V) halide by fractional sublimation; and the purified $WX_5$ having a purity ranging from approximately 99% mol/mol to approximately 100% mol/mol.

Alternatively, the $WX_5$-containing compositions may be synthesized by reaction of tungsten hexahalide with a disilane or polysilane to form a reaction mixture containing tungsten pentahalide and a halosilane by-product. The $WX_5$-containing composition is isolated from the reaction mixture. The disclosed methods may include one or more of the following aspects:

tungsten hexahalide being $WCl_6$;
tungsten hexahalide being $WBr_6$;
tungsten pentahalide being $WCl_5$;
tungsten pentahalide being $WBr_5$;
the disilane having the formula $Si_2R_6$, with each R independently being H, a C1-C4 hydrocarbyl group, or a halide;
no more than 3 Rs being a halide;
the disilane having the formula $Si_2R_6$, with each R independently being H, a C1-C4 hydrocarbyl group, or a halide, provided that no more than 3 R=a halide;
R being H or an alkyl group;
the disilane having the formula $Si_2Me_6$;
the disilane having the formula $Si_2{}^iPr_6$;
the disilane having the formula $Si_2HMe_5$;
the disilane having the formula $Si_2H_2Me_4$;
the disilane having the formula $Si_2H_3Me_3$;
the disilane having the formula $Si_2H_4Me_2$;
the disilane having the formula $Si_2Me_5Cl$;
the disilane having the formula $Si_2Me_5Br$;
the disilane having the formula $Si_2HMe_4Cl$ ($Me_2HSi$—$SiMe_2Cl$);
the disilane having the formula $Si_2HMe_4Br$ ($Me_2HSi$—$SiMe_2Br$);
the disilane having the formula $Si_2Me_4(CH_2)Cl$;
the disilane having the formula $Si_2H_6$;
the disilane having the formula $Si_2Cl_2Me_4$;
the disilane having the formula $Si_2Br_2Me_4$;
the disilane having the formula $Si_2Cl_3Me_3$;
the disilane having the formula $Si_2Br_3Me_3$;
the disilane having the formula $Si_2Et_6$;
the disilane having the formula $Si_2MeEt_5$;
the disilane having the formula $Si_2Me_5Et$;
the disilane having the formula $Si_2H_2Me_2Et_2$ ($Me_2HSi$—$SiHEt_2$);
the disilane having the formula $Si_2H_2Me_3{}^iPr$ ($Me_2HSi$—$SiHMe^iPr$);
the disilane having the formula $Si_2HMe_4{}^iPr$ ($Me_2HSi$—$SiMe_2{}^iPr$);
the disilane having the formula $Si_2Me_5{}^iPr$;
the disilane having the formula $Si_2H_2Me_2Pr_2$;
the disilane having the formula $Si_2Me_3{}^iPr_3$;
the disilane having the formula $Si_2Me_4{}^iPr_2$;
the disilane having the formula $Si_2HMe_2{}^iPr_3$ ($Me_2HSi$—$Si^iPr_3$);
the disilane having the formula $Si_2H_2{}^iPr_4$ ($^iPr_2HSi$—$SiH^iPr_2$);
the disilane having the formula $Si_2HMeEt^iPr_3$ ($MeEtHSi$-$Si^iPr_3$);
the disilane having the formula $Si_2H_2Me_2Pr_2$;
the polysilane having the formula $Si_nR_{2n+2}$, with each R independently being H, a C1-C4 hydrocarbyl group, or a halide and n=3-8;
R being H or an alkyl group;
the polysilane containing no more than n+1 halides;
the polysilane having the formula $Si_3Me_8$ ($Me_3Si$-$Me_2Si$—$SiMe_3$);
the polysilane having the formula $Si_3H_2Me_6$ ($Me_2HSi$-$Me_2Si$—$SiHMe_2$; $Me_3Si$-$Me_2Si$—$SiH_2Me$);
the polysilane having the formula $Si_3H_3Me_5$ ($Me_3Si$-$Me_2Si$—$SiH_3$);
the polysilane having the formula $Si_3H_3Me_4Cl$ ($ClMe_2Si$-$Me_2Si$—$SiH_3$);
the polysilane having the formula $Si_4Me_{10}$ ($Me_3Si$-$Me_2Si$—$SiMe_2$-$SiMe_3$);
the polysilane having the formula $Si_4H_6Me_{10}$ ($H_3Si$-$Me_2Si$—$SiMe_2$-$SiH_3$);
the polysilane having the formula $Si_5Me_{12}$;
the polysilane having the formula $Si_5H_6Me_6$;
the polysilane being a cyclosilane having the formula $Si_nR_{2n}$ (n=3-8);
the cyclosilane having the formula $Me_2Si(CR'2)_nSiMe_2$ (R'=H or Me; n=1-4);
the cyclosilane having the formula $Me_2Si(CH_2)SiMe_2$ (1,1,2,2-tetramethyl-disilacyclopropane);
the cyclosilane having the formula $Si_3H_2Me_4$ (1,1,2,2-tetramethyl-cyclotrisilane);
the cyclosilane having the formula $Si_6Me_{12}$ (dodecamethylcyclohexasilane);
the halosilane by-product being $R_3SiX$, wherein each R is independently H, a C1-C4 hydrocarbyl group, or a halide, and X is from the $WX_6$ reactant;
the halosilane by-product from the disilane or linear polysilane reactant being $R_3Cl$, wherein each R is independently H, a C1-C4 hydrocarbyl group, or a halide, and X is from the $WX_6$ reactant;
the halosilane by-product being trimethyl silyl chloride ($Me_3SiCl$);
the halosilane by-product being trimethyl silyl bromide ($Me_3SiBr$);
the halosilane by-product being triethyl silyl chloride ($Et_3SiCl$);
the halosilane by-product being triethyl silyl bromide ($Et_3SiBr$);
the halosilane by-product being tri-isopropyl silyl chloride ($^iPr_3SiCl$);
the halosilane by-product being tri-isopropyl silyl bromide ($^iPr_3SiBr$);
the halosilane by-product being dimethyl silyl chloride ($Me_2SiHCl$);
the halosilane by-product being dimethyl silyl bromide ($Me_2SiHBr$);

the halosilane by-product being $R_2SiX_2$, wherein each R is independently H, a C1-C4 hydrocarbyl group, or a halide, and X is from the $WX_6$ reactant;

the halosilane by-product from linear or cyclic polysilanes being $R_2SiX_2$, wherein each R is independently H, a C1-C4 hydrocarbyl group, or a halide, and X is from the $WX_6$ reactant;

the halosilane by-product being dimethyl silyl dichloride ($Me_2SiCl_2$);

the halosilane by-product being dimethyl silyl dibromide ($Me_2SiBr_2$);

the halosilane by-product being diethyl silyl dichloride ($Et_2SiCl_2$);

the halosilane by-product being diethyl silyl dibromide ($Et_2SiBr_2$);

the halosilane by-product being di-isopropyl silyl dichloride ($^iPr_2SiCl_2$);

the halosilane by-product being di-isopropyl silyl dibromide ($^iPr_2SiBr_2$);

the halosilane by-product being methyl silyl dichloride ($MeSiHCl_2$);

the halosilane by-product being methyl silyl dibromide ($MeSiHBr_2$);

the halosilane by-product being a combination of $R_3X$ and $R_2SiX_2$, wherein each R is independently H, a C1-C4 hydrocarbyl group, or a halide, and X is from the $WX_6$ reactant;

the reaction mixture consisting essentially of tungsten pentahalide and a halosilane by-product;

the reaction mixture consisting of tungsten pentahalide and a halosilane by-product;

the tungsten hexahalide and disilane or polysilane being reacted in a solvent;

the tungsten hexahalide and disilane or polysilane being reacted without a solvent;

suspending the tungsten hexahalide in a solvent prior to reaction with the disilane or polysilane;

dissolving the disilane or polysilane in a solvent prior to reaction with tungsten hexahalide;

the solvent being the halosilane by-product;

reacting the tungsten hexahalide with the disilane or polysilane at a temperature ranging from approximately 10° C. to approximately the boiling point of the disilane or polysilane and/or solvent;

reacting the tungsten hexahalide with the disilane or polysilane at a temperature ranging from approximately 10° C. to approximately 50° C.;

reacting the tungsten hexahalide with the disilane or polysilane at a temperature ranging from approximately 10° C. to approximately 40° C.;

reacting the tungsten hexahalide with the disilane or polysilane at a temperature ranging from approximately 10° C. to approximately 28° C.;

reacting the tungsten hexahalide with the disilane or polysilane at a temperature ranging from approximately 15° C. to approximately 28° C.;

maintaining a reaction temperature ranging from approximately 10° C. to approximately 50° C.;

maintaining a reaction temperature ranging from approximately 10° C. to approximately 40° C.;

maintaining a reaction temperature ranging from approximately 10° C. to approximately 28° C.;

maintaining a reaction temperature ranging from approximately 15° C. to approximately 28° C.;

stirring the reaction mixture at a speed sufficient to maintain any solid reactant or product in suspension;

stirring the reaction mixture for approximately 10 min to approximately 48 hours prior to the isolation step;

stirring the reaction mixture for approximately 1 hours to approximately 18 hours prior to the isolation step;

stirring the reaction mixture for approximately 3 hours to approximately 8 hours prior to the isolation step;

isolating the $WX_5$-containing composition from the reaction mixture by evaporating the halosilane by-product to produce an isolated $WX_5$-containing composition;

isolating the $WX_5$-containing composition from the reaction mixture by evaporating the halosilane by-product and solvent to produce an isolated $WX_5$-containing composition;

isolating the $WX_5$-containing composition from the reaction mixture by filtration to produce a filtered tungsten pentahalide to produce an isolated $WX_5$-containing composition;

the isolated $WX_5$-containing composition comprising approximately 85% w/w to approximately 100% w/w $WX_5$;

the isolated $WX_5$-containing composition comprising approximately 90% w/w to approximately 100% w/w $WX_5$;

the isolated $WX_5$-containing composition comprising approximately 95% w/w to approximately 100% w/w $WX_5$;

rinsing the isolated $WX_5$-containing composition with a rinse solvent to produce purified tungsten pentahalide;

the halosilane by-product being the same as the rinse solvent;

the halosilane by-product being different from the rinse solvent;

sublimating the isolated $WX_5$-containing composition;

a molar ratio of the disilane to the tungsten (VI) halide being between 0.4:1 and 0.6:1;

a molar ratio of the polysilane having the formula $Si_nR_{2n+2}$ to the tungsten (VI) halide being between approximately 2/(5n−5): 1 and approximately 3/(5n−5): 1.

Also disclosed are the $WX_5$-containing compositions synthesized by the methods disclosed above. The disclosed $WX_5$-containing compositions include on or more of the following aspects:

the $WX_5$-containing composition comprising between approximately 85% w/w and approximately 100% w/w $WX_5$;

the $WX_5$-containing composition comprising between approximately 90% w/w and approximately 100% w/w $WX_5$;

the $WX_5$-containing composition comprising between approximately 95% w/w and approximately 100% w/w $WX_5$;

the $WCl_5$-containing composition comprising between approximately 85% w/w and approximately 100% w/w $WCl_5$;

the $WCl_5$-containing composition comprising between approximately 90% w/w and approximately 100% w/w $WCl_5$;

the $WCl_5$-containing composition comprising between approximately 95% w/w and approximately 100% w/w $WCl_5$;

the $WBr_5$-containing composition comprising between approximately 85% w/w and approximately 100% w/w $WBr_5$;

the $WBr_5$-containing composition comprising between approximately 90% w/w and approximately 100% w/w $WBr_5$;

the WBr$_5$-containing composition comprising between approximately 95% w/w and approximately 100% w/w WBr$_5$;

an Al concentration ranging from approximately 0% to approximately 0.0001% by weight (0-1000 ppb);

an Al concentration ranging from approximately 0% to approximately 0.00005% by weight (0-500 ppb);

an Al concentration ranging from approximately 0% to approximately 0.00002% by weight (0-200 ppb);

a Ti concentration ranging from approximately 0% to approximately 0.00005% by weight (0-500 ppb);

a Ti concentration ranging from approximately 0% to approximately 0.000015% by weight (0-150 ppb);

a Ti concentration ranging from approximately 0% to approximately 0.000005% (0-50 ppb);

a V concentration ranging from approximately 0% to approximately 0.00005% by weight (0-500 ppb);

a V concentration ranging from approximately 0% to approximately 0.00002% (0-200 ppb), a V concentration ranging from approximately 0% to approximately 0.000005% (0-50 ppb))

a Cr concentration ranging from approximately 0% to approximately 0.0001% by weight; (0-1000 ppb);

a Cr concentration ranging from approximately 0% to approximately 0.00005% by weight (0-500 ppb);

a Cr concentration ranging from approximately 0% to approximately 0.00001% by weight (0-100 ppb);

a Fe concentration ranging from approximately 0% to approximately 0.0001% by weight; (0-1000 ppb);

a Fe concentration ranging from approximately 0% to approximately 0.00005% (0-500 ppb);

a Fe concentration ranging from approximately 0% to approximately 0.00002% by weight (0-200 ppb);

a Ni concentration ranging from approximately 0% to approximately 0.0001% by weight (0-1000 ppb);

a Ni concentration ranging from approximately 0% to approximately 0.00005% by weight (0-500 ppb);

a Ni concentration ranging from approximately 0% to approximately 0.00001% by weight (0-100 ppb);

a Cu concentration ranging from approximately 0% to approximately 0.00005% by weight (0-500 ppb);

a Cu concentration ranging from approximately 0% to approximately 0.000015% by weight (0-150 ppb);

a Cu concentration ranging from approximately 0% to approximately 0.000005% by weight (0-50 ppb);

a Mo concentration ranging from approximately 0% to approximately 0.0002% by weight; (0-2000 ppb);

a Mo concentration ranging from approximately 0% to approximately 0.00005% by weight (0-500 ppb);

a Mo concentration ranging from approximately 0% to approximately 0.00002% by weight (0-200 ppb).

Notation and Nomenclature

Certain abbreviations, symbols, and terms are used throughout the following description and claims, and include:

As used herein, the indefinite article "a" or "an" means one or more.

As used herein, the terms "approximately" or "about" mean ±10% of the value stated.

As used herein, the term "comprising" is inclusive or open-ended and does not exclude additional, unrecited materials or method steps; the term "consisting essentially of" limits the scope of a claim to the specified materials or steps and additional materials or steps that do not materially affect the basic and novel characteristics of the claimed invention; and the term "consisting of" excludes any additional materials or method steps not specified in the claim.

As used herein, the term "independently" when used in the context of describing R groups should be understood to denote that the subject R group is not only independently selected relative to other R groups bearing the same or different subscripts or superscripts, but is also independently selected relative to any additional species of that same R group. For example in the formula $MR^1_x$ $(NR^2R_3)_{(4-x)}$, where x is 2 or 3, the two or three $R^1$ groups may, but need not be identical to each other or to $R^2$ or to $R^3$. Further, it should be understood that unless specifically stated otherwise, values of R groups are independent of each other when used in different formulas.

As used herein, the term "hydrocarbyl group" refers to a functional group containing carbon and hydrogen; the term "alkyl group" refers to saturated functional groups containing exclusively carbon and hydrogen atoms. The hydrocarbyl group may be saturated or unsaturated. Either term refers to linear, branched, or cyclic groups. Examples of linear alkyl groups include without limitation, methyl groups, ethyl groups, propyl groups, butyl groups, etc. Examples of branched alkyls groups include without limitation, t-butyl. Examples of cyclic alkyl groups include without limitation, cyclopropyl groups, cyclopentyl groups, cyclohexyl groups, etc.

As used herein, the abbreviation "Me" refers to a methyl group; the abbreviation "Et" refers to an ethyl group; the abbreviation "Pr" refers to a propyl group; the abbreviation "nPr" refers to a "normal" or linear propyl group; the abbreviation "iPr" refers to an isopropyl group; the abbreviation "Bu" refers to a butyl group; the abbreviation "nBu" refers to a "normal" or linear butyl group; the abbreviation "tBu" refers to a tert-butyl group, also known as 1,1-dimethylethyl; the abbreviation "sBu" refers to a sec-butyl group, also known as 1-methylpropyl; the abbreviation "iBu" refers to an iso-butyl group, also known as 2-methylpropyl; the term "halide" refers to the halogen anions F$^-$, Cl$^-$, Br$^-$, and I$^-$; and the abbreviation "TMS" refers to trimethylsilyl or —SiMe$_3$.

As used herein, the abbreviation "RT" means room temperature or a temperature ranging from approximately 18° C. to approximately 25° C.

As used herein, the term "olefin" means an unsaturated hydrocarbon containing at least one carbon-carbon double bond.

As used herein, the term "aliphatic halohydrocarbon solvent" means that the halogen-containing hydrocarbon solvent is not an aromatic compound, such as benzene or toluene. In other words, the disclosed solvents do not include any aromatic compounds, which are cyclic, planar molecules with a ring of resonance bonds.

As used herein, the term "anhydrous" means containing between approximately zero ppmv and approximately 100 ppmv moisture and preferably between approximately zero ppmv and approximately 10 ppmv moisture.

As used herein, any reference to WX$_5$ includes the monomeric WX$_5$, the dimeric W$_2$X$_{10}$, and combinations thereof.

Throughout the specification and claims, the halogen atoms X on the tungsten hexahalide reactant, tungsten pentahalide reaction product, halosilane by-product, and solvent must be the same (e.g., WCl$_6$+Si$_2$Me$_6$→WCl$_5$+SiMe$_3$Cl; WBr$_6$+Si$_2$Me$_6$-WBr$_5$+SiMe$_3$Br).

The standard abbreviations of the elements from the periodic table of elements are used herein. It should be understood that elements may be referred to by these abbreviations (e.g., W refers to tungsten, Mn refers to manganese, Si refers to silicon, C refers to carbon, H refers to hydrogen, etc.).

Any and all ranges recited herein are inclusive of their endpoints (i.e., x=1 to 4 or x ranges from 1 to 4 includes x=1, x=4, and x=any number in between), irrespective of whether the term "inclusively" is used.

BRIEF DESCRIPTION OF THE DRAWINGS

For a further understanding of the nature and objects of the present invention, reference should be made to the following detailed description, taken in conjunction with the accompanying drawing wherein.

DESCRIPTION OF PREFERRED EMBODIMENTS

Figure 1:
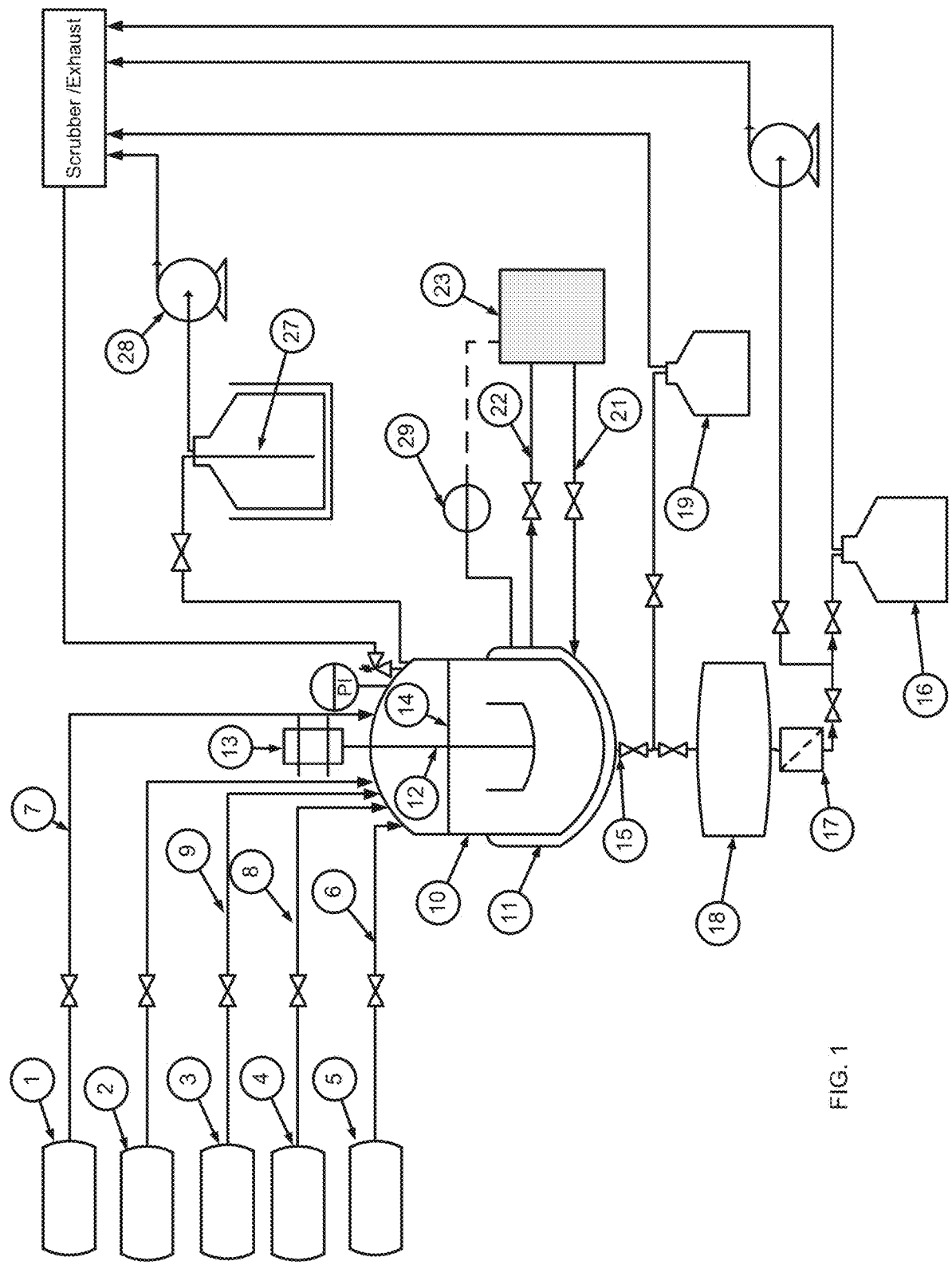
FIG. 1 is a schematic diagram of an apparatus in which the disclosed synthesis methods may be performed.

Methods for preparing $WX_5$-containing compositions at high purity levels are disclosed. The disclosed heterogeneous wet synthesis methods produce the $WX_5$-containing composition from tungsten (VI) halides. The disclosed methods produce products having purities suitable for use in semiconductor processing. The disclosed methods do not require complicated apparatus.

Both methods described herein minimize the formation of over-reduced by-products, such as Tungsten (IV) halide (i.e., $WX_4$). Additionally, both methods operate under atmospheric pressure and at low temperatures. At these temperature and pressure conditions, tungsten halides are at least partially present as solids in the solvent and the reactions take place as a heterogeneous mixture.

Olefin Reaction

Tungsten hexahalide (i.e., $WX_6$) is added to a reactor. $WCl_6$ and $WBr_6$ are commercially available. A solvent is added to form a heterogeneous mixture at a temperature ranging from approximately 10° C. to approximately 70° C. An olefin is added to the mixture. The mixture is stirred to form a stirred heterogeneous mixture at a speed sufficient to maintain any solids in suspension. The $WX_5$-containing composition is isolated from the stirred mixture.

The reactions are described in the following equations:

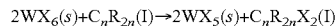

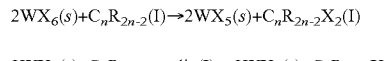

$$2WX_6(s)+C_nR_{2n-2}\text{ cyclic}(l) \rightarrow 2WX_5(s)+C_nR_{2n-2}X_2 \text{ cyclic}(l)$$

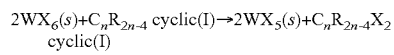

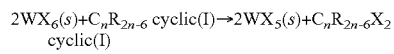

Wherein l=liquid; s=solid; X═Cl or Br; each R is independently H or C1-C4 hydrocarbyl, preferably H or Me; and n=5-11, provided that n≠6 for cyclic $C_nR_{2n-4}$ The tungsten (VI) halide may be added to a reactor containing the solvent or vice versa. In other words, the order of addition is not important. The solvent may be added to a reactor containing the tungsten (VI) halide to form a suspension at a temperature ranging from approximately 10° C. to approximately 70° C., preferably ranging from approximately 15° C. to approximately 28° C. The reactant, tungsten (VI) halide, will remain at least partially solid, producing a suspension in the solvent during the reaction. The pressure in the reactor is preferably around atmospheric pressure (approximately 91 kPa to approximately 112 kPa). The ratio of solvent to tungsten (VI) halide is chosen from the range of approximately 3 mL to approximately 20 mL of solvent per approximately 1 g of tungsten (VI) halide, preferably approximately 3 mL to approximately 10 mL of solvent per approximately 1 g of tungsten (VI) halide.

As tungsten halides may degrade to tungsten oxyhalides, other tungsten halides, and/or tungsten oxides, care must be taken to ensure that the tungsten halide reactant has a purity ranging from approximately 90% mol/mol to approximately 100% mol/mol. Preferably, the tungsten halide has a purity ranging from approximately 95% mol/mol to approximately 100% mol/mol, and more preferably from approximately 99% mol/mol to approximately 100% mol/mol. One of ordinary skill in the art will recognize that the tungsten halide reactant purity may be determined at least by using UV/VIS spectroscopy. See, e.g., Thorn-Csanyi et al., Journal of Molecular Catalysis 65 (1991) pp. 261-267. One of ordinary skill in the art would also recognize that the tungsten (VI) halide may be purified using sublimation, when necessary.

Tungsten halide reactants containing tungsten oxyhalides, other tungsten halides, and/or tungsten oxides content lead to low yields of Tungsten (V) halides. Therefore, the tungsten oxyhalides, other tungsten halides, and tungsten oxides contents in the tungsten (VI) halide reactant may range from approximately 0% mol/mol to approximately 10% mol/mol, preferably from approximately 0% mol/mol to approximately 5% mol/mol, and more preferably from approximately 0% mol/mol to approximately 1% mol/mol.

The solvent may be a hydrocarbon, halo-hydrocarbon, halocarbon (acyclic or cyclic), or mixtures thereof. Preferably, the anhydrous solvent is a halo-hydrocarbon or halocarbon. Applicants believe that aliphatic halohydrocarbon solvents facilitate formation of the desired tungsten pentahalide product.

Furthermore, the solvent must be a liquid at the reaction temperature and pressure. Therefore, the selected solvent remains a liquid at temperatures ranging between 10° C. and the boiling point of the olefin at atmospheric pressure. The solvent must also be dry (anhydrous) in order to prevent the formation of oxygenated species, such as tungsten oxides or oxyhalides. One of ordinary skill in the art would recognize the methods required to prepare an anhydrous solvent. The solvent may contain between approximately zero ppmv and approximately 100 ppmv moisture. Preferably, the solvent contains between approximately zero ppmv and approximately 10 ppmv moisture.

Exemplary solvents include dichloromethane, chloroform, trichlorofluoromethane, Dichlorodifluoromethane, 1,2-dichloroethane, 1,1-dichloroethane, 1-chloro-2-fluoroethane, 1,1,1-trichloroethane, 1,1,2-trichloroethane, 2-chloro-1,1-difluoroethane, 1,1-dichloro-1-fluoroethane, 1,1-Dichloro-1,2-difluoroethane, 1,1-Dichloro-2,2-difluoroethane, 1,2-Dichloro-1,2-difluoroethane, 1,2-Dichloro-1,1-difluoroethane, 1,1,2-Trichloro-1-fluoroethane, 1,1,2-Trichloro-1,2-difluoroethane, 1,2-Dichlorotetrafluoroethane, 2-chloro-1,1,1-trifluoroethane, 1,1,2-Trichloro-2-fluoroethane, 1-chloro-1,1,2,2-tetrafluoroethane, 1,2,2-Trichloro-1,1-difluoroethane, 1,1,2,2-Tetrachlorofluoroethane, 1-Bromo-2-chloro-1,1,2-trifluoroethane, 2-Bromo-2-chloro-, 1,1-trifluoroethane, 1,1,1-Trichloro-2,2,2-trifluoroethane, 1,1,2-Trichloro-1,2,2-trifluoroethane, Tetrachloro-1,2-difluoroethane, Tetrachloro-1,1,1-difluoroethane, 1-chloropropane, 2-chloropropane, 3,3-Dichloro-1,1,1,2,2-pentafluoropropane, 1,2-Dichloro-1,2,2,3,3-pentafluoropropane, 1-chlorobutane, chloroform, 2-chlorobutane, 2-methylbutane, 2,2-dimethylbutane, 2,3-dimethylbutane, pentane, 2-methylpentane, 3-methylpentane, 2,2-dimethylpentane, 2,3-dimethylpentane, 2,4-dimethylpentane, hexane, cyclohexane, octane, ethylbenzene, chlorobenzene, xylenes, or combinations thereof. These solvents are commercially available or may be synthesized by methods known in the art.

Preferably, the solvent is a low boiling point solvent because it is easier to remove by vacuum at the end of the synthesis process. The boiling point of the solvent is preferably below the melting point of any of the reactants or products. For example, the boiling point of the solvent is preferably below its approximately 240° C. melting point of tungsten pentachloride for the synthesis of tungsten pentachloride, and more preferably below 200° C. Exemplary low boiling point solvents include pentane, hexane, dichloromethane, 1,2-dichloroethane, trichlorofluoromethane, 1,1-dichloro-1-fluoroethane, 1,1,1-trichloro-2,2,2-trifluoroethane, 1,1,2-trichloro-1,2,2-trifluoroethane, and combinations thereof. More preferably, the low boiling point solvent is an aliphatic halohydrocarbon, such as dichloromethane, 1,2-dichloroethane, trichlorofluoromethane, 1,1-dichloro-1-fluoroethane, 1,1,1-trichloro-2,2,2-trifluoroethane, 1,1,2-trichloro-1,2,2-trifluoroethane, and combinations thereof.

An olefin having the formula $C_nR_{2n}$, $C_nR_{2n-2}$, $C_nR_{2n-4}$, cyclic $C_nR_{2n-2}$, cyclic $C_nR_{2n-4}$, cyclic $C_nR_{2n-6}$, wherein each R is independently H or a C1-C4 hydrocarbyl group and n=4-11, provided that n is not 6 for cyclic $C_nR_{2n-4}$, is added to the reactor containing the tungsten (VI) halide/solvent suspension to produce a mixture at a temperature ranging from approximately 10° C. to approximately 70° C., preferably ranging from approximately 10° C. to approximately 28° C., and more preferably at approximately room temperature (i.e., approximately 20° C. to approximately 27° C.). Preferably, the reaction is not or only slightly exothermic and therefore the reaction temperature is maintained at or close to the original addition temperature. The olefin may be added as a liquid or gas. When the olefin is a gas, a solvent capable of dissolving the gaseous olefin must be selected. Once again, the olefin should be anhydrous and preferably contains between approximately zero ppmv and approximately 100 ppmv moisture to prevent the formation of oxygenated species, such as tungsten oxides or oxyhalides. The pressure in the reactor preferably remains around atmospheric pressure for safety and cost reasons. However, one of ordinary skill in the art will recognize that the reaction may also be performed in a pressure reactor without deviating from the teachings herein.

Exemplary olefins having the formula $C_nR_{2n}$, wherein each R is independently H or a C1-C4 hydrocarbyl group and n=4-11, include 1-pentene, 2-methyl-1-butene, trans-2-pentene, cis-2-pentene, 1-2-methyl-2-butene, 3,3-dimethyl-1-butene, 4-methyl-1-pentene, 3-methyl-1-pentene, 2,3-dimethyl-1-butene, 4-methyl-cis-2-pentene, 4-methyl-trans-2-pentene, 2-methyl-1-pentene, 1-hexene, 2-ethyl-1-butene, cis-3-hexene, trans-3-hexene, 2-methyl-2-pentene, 3-methyl-trans-2-pentene, trans-2-hexene, cis-2-hexene, 3-methyl-cis-2-pentene, 4,4-dimethyl-1-pentene, 2,3-dimethyl-2-butene, 4,4-dimethyl-trans-2-pentene, 3,3-dimethyl-1-pentene, 2,3,3-trimethyl-1-butene, 4,4-dimethyl-cis-2-pentene, 3,4-dimethyl-1-pentene, 2,4-dimethyl-2-pentene, 3-methyl-1-hexene, 2,3-dimethyl-1-pentene, 3-ethyl-1-pentene, 5-methyl-1-hexene, 5-methyl-trans-2-hexene, 2-methyl-3-hexene, 4-methyl-1-hexene, 3,4-dimethyl-2-pentene, 4-methyl-cis-2-hexene, 4-methyl-trans-2-hexene, 2-ethyl-3-methyl-1-butene, 5-methyl-cis-2-hexene, 2-methyl-1-hexene, 3-methyl-trans-3-hexene, 1-heptene, 3-methyl-trans-2-hexene, 2-ethyl-1-pentene, 3-methyl-cis-3-hexene, 2-methyl-2-hexene, cis-3-heptene, 5-3-ethyl-2-pentene, 2,3-dimethyl-2-pentene, trans-2-heptene, cis-2-heptene, 2,2-dimethyl-trans-3-hexene, 2,4,4-trimethyl-1-pentene, 2,5-dimethyl-3-hexene, 5,5-dimethyl-1-hexene, 2-isopropyl-3-methyl-1-butene, 3,4,4-trimethyl-1-pentene, 3,5-dimethyl-1-hexene, 3,3-dimethyl-1-hexene, 5,5-dimethyl-trans-2-hexene, 2,4,4-trimethyl-2-pentene, 3,3,4-trimethyl-1-pentene, 2,2-dimethyl-cis-3-hexene, 4,4-diemthyl-2-hexene, 5,5-dimethyl-cis-2-hexene, 4,4-dimethyl-1-hexene, 3-ethyl-4-methyl-1-pentene, 2,4-dimethyl-trans-3-hexene, 2,3,4-trimethyl-1-pentene, 2,3,3-trimethyl-1-pentene, 4,5-dimethyl-1-hexene, 2,4-dimethyl-cis-3-hexene, 3,3-dimethyl-2-ethyl-1-butene, 3-ethyl-2-methyl-1-pentene, 4,5-dimethyl-2-hexene, 2-ethyl-4-methyl-1-pentene, 3-ethyl-1-hexene, 2,3-dimethyl-1-hexene, 2,4-dimethyl-4-hexene, 3-methyl-1-heptene, 2,4-dimethyl-1-hexene, 3-methyl-1-heptene, 2,4-dimethyl-1-hexene, 2,5-dimethyl-1-hexene, 3-ethyl-3-methyl-1-pentene, 3,4-dimethyl-1-hexene, 3,4,4-trimethyl-2-pentene, 3,5-dimethyl-2-hexene, 2-methyl-3-heptene, 5-methyl-3-heptene, 2,5-dimethyl-2-hexene, 2-ethyl-3-methyl-1-pentene, 4-methyl-1-heptene, 6-methyl-3-heptene, 4-ethyl-2-hexene, 2-isopropyl-1-pentene, 5-methyl-1-heptene, 4-methyl-2-heptene, 2,3-dimethyl-3-hexene, 4-methyl-2-octene, 4-ethyl-4-methyl-trans-2-pentene, 3-ethyl-4-methyl-cis-2-pentene, 3,4-dimethyl-2-hexene, 3-ethyl-3-hexene, 2,3,4-trimethyl-2-pentene, 6-methyl-2-heptene, 2-n-propyl-1-pentene, 5-methyl-2-heptene, 2-methyl-1-heptene, 2-ethyl-1-hexene, 4-methyl-3-heptene, 3-ethyl-2-hexene, 3-methyl-3-heptene, 1-octene, trans-4-octene, 3-methyl-2-heptene, trans-4-octene, 3-methyl-2-heptene, cis-4-octene, 2,3-dimethyl-2-hexene, 3,4-dimethyl-trans-3-hexene, 6-methyl-1-heptene, cis-3-octene, trans-3-octene, 2-methyl-2-heptene, trans-2-octene, cis-2-octene, 2,6-dimethyl-2-heptene, 2-methyl-4-octene, 7-methyl-3-octene, 2-methyl-2-octene, 4-nonene, 1-nonene, 2-nonene, 5-decene, 1-decene, 4-decene, 2-undecene, 5-undecene, 1-undecene, 1-dodecene, and combinations thereof. These olefins are either commercially available or may be synthesized by methods known in the art. One of ordinary skill in the art will further recognize that aromatics, terpenes, ethylidene, isopropenyl, and bicyclics may also be used as the olefin without departing from the teachings herein.

Exemplary olefins having the formula $C_nR_{2n-2}$, wherein each R is independently H or a C1-C4 hydrocarbyl group and n=4-11, include 1,4-pentadiene, 2-methyl-1,3-butadiene, 3-methyl-1-2-butadiene, 1,3-pentadiene (piperylene), 1-trans-3-pentadiene, 1-cis-3-pentadiene, 1,2-pentadiene, 2,3-pentadiene, 3-methyl-1,4-pentadiene, 2-methyl-1,4-pentadiene, 1,5-hexadiene, trans-1,3-hexadiene, 2,3-hexadiene, 2,3-dimethyl-1,3-butadiene, 4-methyl-1,2-pentadiene, 2-methyl-2,3-pentadiene, 1,4-hexadiene, 2-ethyl-1,3-butadiene, 1,2-hexadiene, 4-methyl-1,3-pentadiene, 3-methyl-1,3-pentadiene, 3-methyl-1,2-pentadiene, 2,4-hexadiene, 2-methyl-1,5-hexadiene, 4,4-dimethyl-1,2-pentadiene, 2,4-dimethyl-2,3-pentadiene, 5-methyl-1,4-hexadiene, 2-methyl-1,5-hexadiene, 2,4-dimethyl-1,3-pentadiene, methyl-1,2-hexadiene, 1,4-heptadiene, 3,3-dimethyl-1,5-hexadiene, 3,4-dimethyl-1,5-hexadiene, 1,2-heptadiene, 2-methyl-2,4-hexadiene, 3-methyl-2,4-hexadiene, 2,4-heptadiene, 4-methyl-1,3-hexadiene, 3-methyl-1,5-heptadiene, 2,4-dimethyl-2,4-hexadiene, 6-methyl-2,4-heptadiene, 6-methyl-1,3-heptadiene, 2,5-dimethyl-1,3-hexadiene, 2,5-dimethyl-1,5-hexadiene, 2-methyl-1,3-heptadiene, 4-methyl-2,4-heptadiene, 3-methyl-2,4-heptadiene, 3,5-dimethyl-2,4-heptadiene, 2,4-octadiene, 2,5-dimethyl-2,5-hexadiene, 2,6-dimethyl-2,4-heptadiene, 2,6-dimethyl-1,3-heptadiene, 2,6-dimethyl-1,5-heptadiene, 1,8-nonadiene, 3,6-dimethyl-2,4-heptadiene, 2,6-dimethyl-2,5-heptadiene, 2,7-nonadiene, 4,4-dimethyl-1,7-octadiene, 4,5-dimethyl-2,6-octadiene, 3,6-dimethyl-2,6-octadiene, 2,6-dimethyl-2,7-octadiene, 2,4-dimethyl-2,4-octadiene, 2,7-dimethyl-2,6-octadiene, 3,7-dimethyl-2,4-octadiene, 2,6-dimethyl-2,6-octadiene, and combinations thereof. These olefins are either commercially available or may be synthesized by methods known in the art.

Exemplary olefins having the formula $C_nR_{2n-4}$, wherein each R is independently H or a C1-C4 hydrocarbyl group and n=4-11, include trans-1,3,5-hexatriene, cis-1,3,5-hexatriene, and combinations thereof. These olefins are either commercially available or may be synthesized by methods known in the art.

Exemplary olefins having the formula cyclic $C_nR_{2n-2}$, wherein each R is independently H or a C1-C4 hydrocarbyl group and n=4-11, include 3-methylcyclobutene, cyclopentene, methylcyclobutene, 3-methylcyclopentene, 4-methylcyclopentene, 1-methylcyclopentene, cyclohexene, 3,3-dimethylcyclopentene, 1,3-dimethylcyclopentene, 1,4-dimethylcyclopentene, 3-ethylcyclopentene, 4-methylcyclohexene, 3-methylcyclohexene, 1,2-dimethylcyclopentene, 4-ethylcyclopentene, 1-ethylcyclopentene, 1,5,5-trimethylcyclopentene, 1-methylcyclohexene, cycloheptene, 4,4-dimethylcyclohexene, 3,3-dimethylcyclohexene, 1,2,3-trimethylcyclopentene, 1,4-dimethylcyclohexene, 1,5-dimethylcyclohexene, 4-vinylcyclohexene, 4-ethylcyclohexene, 4-ethylcyclohexene, 1,6-dimethylcyclohexene, 3-ethylcyclohexene, 1,2,3,3-tetramethylcyclopentene, 1-ethylcyclohexene, 1,2-dimethylcyclohexene, 1-methylcycloheptene, 1,5,5-trimethylcyclohexene, 1,4,4-trimethylcyclohexene, 1,5,6-trimethylcyclohexene, cyclooctatetraene, 1,3,5-trimethylcyclohexene, cyclooctene, 1,4,5-trimethylcyclohexene, 1-vinylcyclohexene, 1,6,6-trimethylcyclohexene, 1-ethyl-4-methylcyclohexene, 1,2,3-trimethylcyclohexene, 1-ethyl-5-methylcyclohexene, allylcyclohexene, 1,4,4-trimethylcycloheptene, cis-cyclodecene, and combinations thereof. These olefins are either commercially available or may be synthesized by methods known in the art.

Exemplary olefins having the formula cyclic $C_nR_{2n-4}$, wherein each R is independently H or a C1-C4 hydrocarbyl group and n=5 or 7-11, provided that n #6, include cyclopentadiene, 1,3-cycloheptadiene, 1,4-cycloheptadiene, 1,4-cyclooctadiene, 1,5-cyclooctadiene, 4-methyl-3,5-octadiene, 7-methyl-2,4-octadiene, or combinations thereof. These olefins are either commercially available or may be synthesized by methods known in the art.

Exemplary olefins having the formula cyclic $C_nR_{2n-6}$, wherein each R is independently H or a C1-C3 hydrocarbyl group and n=7-11, include 1,3,5-cycloheptatriene, 1,3,5-cyclooctatriene, and combinations thereof. These olefins are either commercially available or may be synthesized by methods known in the art.

Preferably the olefin has a boiling point between approximately room temperature and 70° C. Exemplary olefins having this boiling point include 1,4-pentadiene, 1-pentene, 2-methyl-1-butene, 3-methylcyclobutene, 2-methyl-1,3-butadiene, trans-2-pentene, cis-2-pentene, 1-methylcyclobutene, 2-methyl-2-butene, 3-methyl-1-2-butadiene, cyclopentadiene, 1,3-pentadiene (piperylene), 3,3-dimethyl-1-butene, 1-trans-3-pentadiene, 1-cis-3-pentadiene, cyclopentene, 1,2-pentadiene, 2,3-pentadiene, 4-methyl-1-pentene, 3-methyl-1-pentene, 3-methyl-1,4-pentadiene, 2,3-dimethyl-1-butene, 2,3-dimethyl-2-butene, 2-methyl-1,4-pentadiene, 4-methyl-cis-2-pentene, 4-methyl-trans-2-pentene, 1,5-hexadiene, 2-methyl-1-pentene, 1-hexene, 2-ethyl-1-butene, trans-1,3-hexadiene, 3-methylcyclopentene, cis-3-hexene, trans-3-hexene, 2-methyl-2-pentene, trans-2-hexene, cis-2-hexene, 1,4-hexadiene, and combinations thereof.

Even more preferably, the anhydrous olefin is selected from cis/trans 2-pentene, 1-pentene, 1-hexene, 1,5-hexadiene, 2-methyl-1,3-butadiene, 2,3-dimethyl-2-butene, 3,3-dimethyl-1-butene, 4-methyl-1-pentene, cyclopentene, or combinations thereof.

The molar ratio of the tungsten (VI) halide to the anhydrous olefin is between 0.5:1 and 2:1 and preferably between 1:1 and 1.8:1. However, as demonstrated in the following examples, a large excess of olefin leads to low tungsten (V) halides yields and formation of unwanted by-products. Therefore, the molar ratio of Tungsten (VI) halide to the anhydrous olefin is preferably 0.6:1 to 1.8:1. As further demonstrated in the following examples, a slight excess of olefin leads to the complete conversion to the lower valence tungsten halides (V or lower) which are more suitable for separation by sublimation. Therefore, the molar ratio of tungsten (VI) halide to anhydrous olefin is more preferably 0.6:1 to 1.8:1.

The mixture is stirred for approximately 10 min to approximately 48 hours at a temperature range of approximately 10° C. to approximately the boiling point of the olefin or solvent, preferably from approximately 10° C. to approximately 50° C., and more preferably at approximately room temperature. The reaction mixture is stirred using a stirrer and at a speed sufficient to maintain any solid reactant or product in suspension. For larger batches, a double bladed stirrer may be required to maintain the solid reactants in suspension. For example, in a 22 L reactor, the stirrer may spin at a range of approximately 50 rpm to approximately 500 rpm, preferably from approximately 150 rpm to approximately 300 rpm. One of ordinary skill in the art will recognize that the reactor size and shape will dictate the speed needed to maintain the solid reactants in suspension. The mixture produced comprises tungsten (IV) halide, tungsten (V) halide, unreacted Tungsten (VI) halide, all suspended in the mixture, the solvent in liquid form, haloalkanes, and possible impurities.

After reaction, the reaction product may be isolated from the mixture by evaporating the volatiles, such as the solvent or any other volatile components of the mixture. The mixture may be stirred in vacuo. The mixture may also be warmed to temperatures ranging from approximately 30° C. to below the boiling point of the solvent. In another alternative, the mixture may be stirred in vacuo and warmed. The resulting solid product is a mixture of the $WCl_5$ with any unreacted $WCl_6$ and overreacted $WCl_4$.

Alternatively, the reaction mixture may be filtered to remove the solvent, the by-products and impurities. Typical filters include glass or polymer frit filters. The $WX_5$-containing composition may then be purified by successive washings with a rinse solvent and dried by vacuo. Once again, the rinse solvent must be dry (anhydrous) in order to prevent the formation of oxygenated species, such as tungsten oxides or oxyhalides. The rinse solvent may contain between approximately zero ppm and approximately 100 ppm moisture. Preferably, the rinse solvent contains between approximately zero ppm and approximately 10 ppm moisture.

In another alternative, the reaction mixture may be filtered to remove the solvent, by-products, and impurities and rinsed, as above, followed by vacuum evaporation of any remaining volatiles components The rinse solvent may be the same or different from the reaction solvents disclosed above. Exemplary rinse solvents include dichloromethane, chloroform, 1-chloropropane, 2-chloropropane, 1-chlorobutane, 2-chloro-butane, pentane, heptane, octane, ethylbenzene, xylenes. Preferably, the rinse solvent is halogen containing solvents and low boiling points solvents because the removal by high vacuum will be facilitated. Other rinse solvents having properties similar to dichloromethane are also preferable in the disclosed methods.

The isolated $WX_5$-containing composition comprises between approximately 60% w/w to approximately 100% w/w $WX_5$.

Silane Reaction

Alternatively, disilane or polysilane may be used in place of the olefin. The reactions are described in the following equations:

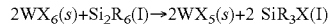

$(2n-2)\ WX_6\ (s)+Si_nR_{2n+2}\ (g,\ l\ or\ s)\rightarrow(2n-2)\ WX_5\ (s)+2\ SiR_3X\ (l)+(n-2)\ SiR_2X_2\ (l)$ wherein g=gas; l=liquid; s=solid; X=Cl or Br; each R is independently H, a C1-C4 hydrocarbyl group, preferably H or Me, or a halide; and n=3-8. No more than 3 Rs should be a halide. One of ordinary skill in the art will recognize that the required molar concentration of the polysilane will be less than the required molar concentration of the disilane. More particularly, the molar ratio of the polysilane having the formula $Si_nR_{2n+2}$ to the tungsten (VI) hexahalide will be between approximately 2/(5n-5):1 and approximately 3/(5n-5): 1. For example, $Si_3Me_8$ requires half the molar concentration of $Si_2Me_6$; $Si_4Me_{10}$ requires ⅓ the molar concentration of $Si_2Me_6$; etc.

Tungsten hexahalide (i.e., $WX_6$) is added to a reactor. $WCl_6$ and $WBr_6$ are commercially available. The disilane is added to form a heterogeneous mixture at a temperature ranging from approximately 10° C. to approximately 50° C. The mixture is stirred to form a stirred heterogeneous mixture at a speed sufficient to maintain any solids in suspension. For example, in a 22 L reactor, the stirrer may spin at a speed ranging from approximately 50 rpm to approximately 500 rpm, preferably from approximately 150 rpm to approximately 300 rpm. The solid tungsten halide product is isolated from the stirred mixture As in the olefin reaction, care must be taken to ensure that the tungsten halide reactant has a purity ranging from approximately 90% mol/mol to approximately 100% mol/mol. Preferably, the tungsten halide has a purity ranging from approximately 95% mol/mol to approximately 100% mol/mol, and more preferably from approximately 98% mol/mol to approximately 100% mol/mol. Similarly, the tungsten oxyhalides, other tungsten halides, and tungsten oxides contents in the tungsten (VI) halide reactant may range from approximately 0% mol/mol to approximately 10% mol/mol, preferably from approximately 0% mol/mol to approximately 5% mol/mol, and more preferably from approximately 0% mol/mol to approximately 1% mol/mol.

The tungsten (VI) halide may be added to a reactor containing the disilane or polysilane or vice versa. In other words, the order of addition is not important with regard to the final product. However, adding the tungsten (VI) halide to the disilane or polysilane may lower the yield of the $WX_5$-containing composition and produce over-reduced by-products. The disilane or polysilane may be added to a reactor containing the tungsten (VI) halide to form a suspension at a temperature ranging from approximately 10° C. to approximately 50° C., preferably ranging from approximately 15° C. to approximately 28° C. As the reaction is exothermic, external cooling may be used to maintain the temperature below 50° C. The tungsten (VI) halide reactant will remain at least partially solid, producing a suspension in the disilane or polysilane during the reaction. The pressure in the reactor is preferably around atmospheric pressure (approximately 91 kPa to approximately 112 kPa).

The ratio of the tungsten (VI) halide to the disilane ranges from approximately 0.4 molar equivalents to approximately 0.6 molar equivalents of disilane per approximately 1 molar equivalent of tungsten (VI) halide, preferably from approximately 0.45 molar equivalents to approximately 0.55 molar equivalents of disilane per approximately 1 molar equivalent of tungsten (VI) halide. One of ordinary skill in the art will recognize that the appropriate stoichiometric molar ratio for reactions using polysilanes will be the disilane molar concentration divided by the number of Si—Si bonds in the corresponding polysilane. For example, the ratio of trisilane to tungsten (VI) halide is chosen from the range of approximately 0.2 molar equivalents to approximately 0.3 molar equivalents of trisilane per approximately 1 molar equivalent of tungsten (VI) halide, preferably from approximately 0.22 molar equivalents to approximately 0.28 molar equivalents of trisilane per approximately 1 molar equivalent of tungsten (VI) halide; and the ratio of tetrasilane to tungsten (VI) halide is chosen from the range of approximately 0.13 molar equivalents to approximately 0.2 molar equivalents of tetrasilane per approximately 1 molar equivalent of tungsten (VI) halide, preferably from approximately 0.15 molar equivalents to approximately 0.18 molar equivalents of tetrasilane per approximately 1 molar equivalent of tungsten (VI) halide.

A disilane or polysilane having the formula $Si_2R_6$, $Si_nR_{2n+2}$, or $Si_nR_{2n}$, wherein each R is independently H or a C1-C4 hydrocarbyl group, or a halide, and n=3-8, is added to the reactor containing the tungsten (VI) halide to produce a mixture at a temperature ranging from approximately 10° C. to approximately 50° C., preferably ranging from approximately 10° C. to approximately 28° C., and more preferably at approximately room temperature (i.e., approximately 20° C. to approximately 27° C.). The disilane or polysilane may be added as a gas, liquid, or solid. When the disilane or polysilane is a gas, the gas may be captured or dissolved in a solvent prior to introduction into the reactor. Alternatively, the gas disilane or polysilane may be bubbled into a tungsten (VI) halide/solvent mixture. When the disilane or polysilane is a solid, a solvent capable of dissolving or suspending the disilane or polysilane may also be used. The disilane or polysilane and any solvents should be anhydrous and preferably contain between approximately zero ppmv and approximately 100 ppmv moisture to prevent the formation of oxygenated species, such as tungsten oxides or oxyhalides. The pressure in the reactor preferably remains around atmospheric pressure for safety and cost reasons. However, one of ordinary skill in the art will recognize that the reaction may also be performed in a pressure reactor without deviating from the teachings herein.

Exemplary disilanes having the formula $Si_2R_6$, wherein each R is independently H, a C1-C4 hydrocarbyl group, or a halide, include $Si_2Me_6$, $Si_2HMe_5$, $Si_2H_2Me_4$, $Si_2H_3Me_3$, $Si_2H_4Me_2$, $Si_2Me_5Cl$, $Si_2Me_5Br$, $Si_2HMe_4Cl$ ($Me_2HSi$—$SiMe_2Cl$), $Si_2HMe_4Br$ ($Me_2HSi$—$SiMe_2Br$), $Si_2Me_4CH_2Cl$, $Si_2H_6$, $Si_2Cl_2Me_4$, $Si_2Br_2Me_4$, $Si_2Cl_3Me_3$, $Si_2Br_3Me_3$, $Si_2Et_6$, $Si_2MeEt_5$, $Si_2Me_5Et_5$, $Si_2H_2Me_2Et_2$ ($Me_2HSi$—$SiHEt_2$), $Si_2H_2Me_3{}^iPr$ ($Me_2HSi$—$SiHMe^iPr$), $Si_2HMe_4{}^iPr$ ($Me_2HSi$—$SiMe_2{}^iPr$), $Si_2Me_5{}^iPr$, $Si_2H_2Me_2{}^iPr_2$, $Si_2Me_3{}^iPr_3$, $Si_2Me_4{}^iPr_2$, $Si_2HMe_2{}^iPr_3$ ($Me_3Si$—$SiH^iPr_3$), $Si_2HMe_2{}^iPr_3$ ($Me_2HSi$—$Si^iPr_3$), $Si_2H_2{}^iPr_4$ ($^iPr_2HSi$—$SiH^iPr_2$), $Si_2HMeEt^iPr_3$ ($MeEtHSi$-$Si^iPr_3$), $Si_2H_2Me_2Pr_2$, $MeHSi(CH_2)_nSiHMe$ (n=1-4), and combinations thereof.

Exemplary polysilanes having the formula $Si_nR_{2n+2}$ or $Si_nR_{2n}$, wherein each R is independently H, a C1-C4 hydrocarbyl group, or a halide, and n=3-8, include trisilane $Si_3R_8$, tetrasilane $Si_4R_{10}$, pentasilane $Si_5R_{12}$, and cyclosilanes with the formula $Si_nR_{2n}$, such as $Si_3Me_8$ ($Me_3Si$-$Me_2Si$—$SiMe_3$), $Si_3H_2Me_6$ ($Me_2HSi$-$Me_2Si$—$SiHMe_2$; $Me_3Si$-$Me_2Si$—$SiH_2Me$), $Si_3H_3Me_5$ ($Me_3Si$-$Me_2Si$—$SiH_3$), $Si_3H_3Me_4Cl$ ($ClMe_2Si$-$Me_2Si$—$SiH_3$), $Si_4Me_{10}$ ($Me_3Si$-$Me_2Si$—$SiMe_2$-$SiMe_3$), $Si_4H_6Me_{10}$ ($H_3Si$-$Me_2Si$—$SiMe_2$-$SiH_3$), $Si_5Me_{12}$, $Si_5H_6Me_6$, $Si_3H_2Me_4$ (1,1,2,2-tetramethyl-cyclotrisilane), $Si_6Me_{12}$ (dodecamethyl-cyclohexasilane), and combinations thereof.

A solvent may also be used in the disilane reaction. For example, the tungsten hexahalide and a solvent may be added to a reactor to form a suspension and the disilane or polysilane added to the suspension. Alternatively, the disilane or polysilane may be dissolved or suspended in the same or a different solvent. In another alternative, a solvent may be used with both the tungsten hexahlide and the disilane or polysilane. The solvent may be the same as or different from the halosilane by-product. Suitable solvents include:

i) halo-silanes: $R_3SiX$, $R_2SiX_2$, $RSiX_3$, $SiX_4$, wherein each R independently=C1-C4 alkyl or hydrogen and X=Cl and Br. Exemplary halo-silane solvents include, but are not limited to, $Me_2SiHCl$, $Me_3SiCl$, $Me_2EtSiCl$, $Et_2MeSiCl$, $Et_3SiCl$, $Me_2PrSiCl$, $Me_2SiHBr$, $Me_3SiBr$, $Me_2EtSiBr$, $Et_2MeSiBr$, $Et_3SiBr$, $Me_2PrSiBr$, $Me_2SiCl_2$, $MeEtSiCl_2$, $Et_2SiCl_2$, $Me_2SiBr_2$, $MeEtSiBr_2$, $Et_2SiBr_2$, $MeSiCl_3$, $EtSiCl_3$, $^iPrSiCl_3$, $MeSiBr_3$, $EtSiBr_3$, $PrSiBr_3$, $SiCl_4$, $SiBr_4$, and combinations thereof;

ii) halo-alkanes: R—X, with R>C3 and X=F; Cl, Br, I. Exemplary halo-alkane solvents include, but are not limited to, $C_4H_9$—X, $C_5H_{11}$—X, $C_6H_{13}$—X, and combinations thereof;

iii) halo-cycloalkane: R—X, with R>C5 and X=F; Cl, Br, I. Exemplary halo-cycloalkane solvents include, but are not limited to, $C_5H_9$—X, $C_6H_{11}$—X, $C7H_{13}$—X, and combinations thereof;

iv) R—$X_2$, with R>C1 and X=F; Cl, Br, I. Exemplary R—$X_2$ solvents include, but are not limited to, $CH_2Cl_2$, $CH_2ClBr$, $CH_2Cl$—I, $C_2H_4Cl_2$, $C_2H_4ClF$, and combinations thereof;

v) R—$X_n$, with R>C1, X=F, Cl, Br, I, and n=3 or 4. Exemplary R—$X_n$ solvents include, but are not limited to, $CHCl_3$, $CHClF_2$, $CHCl_2F$, $CClF_3$, and combinations thereof;

vi) halo-arene: (Ar—X, with Ar=phenyl or substituted phenyl ring with a formula as $R_5Ph$-X, each R may be independently H, C1-C4 alkyl, or halide (F, Cl, Br, I), and X=F, Cl, Br, I. Exemplary halo-arene solvents include, but are not limited to, Me-$C_6H_5$—X, $C_6H_4X_2$, and combinations thereof;

vii) or any combinations thereof.

Preferably, the X halide in the solvent is the same as the X halide in the reactants and products, but one of ordinary skill in the art will recognize that any C—X bond is very strong and will not break and contaminate the reactants or products. As a result, the X halide in any C—X containing solvents may differ from the X halide in the reactants and products.

A halide X from $WX_6$ cleaves the Si—Si bond of the disilane or polysilane to produce a halosilane by-product. The halosilane by-product from the disilane or linear polysilane reactants is $R_3SiX$, wherein each R is independently H, a C1-C4 hydrocarbyl group, or a halide, and X is from the $WX_6$ reactant. Exemplary $R_3SiX$ halosilane by-products include, but are not limited to, $Me_3SiCl$, $Me_3SiBr$, $Et_3SiCl$, $Et_3SiBr$, $^iPr_3SiCl$, $^iPr_3SiBr$, $Me_2SiHCl$, or $Me_2SiHBr$. The halosilane by-product from linear or cyclic polysilanes is $R_2SiX_2$, wherein each R is independently H, a C1-C4 hydrocarbyl group, or a halide. Exemplary $R_2SiX_2$ halosilane by-products include, but are not limited to $Me_2SiCl_2$, $Me_2SiBr_2$, $Et_2SiCl_2$, $Et_2SiBr_2$, $^iPr_2SiCl_2$, $^iPr_2SiBr_2$, $MeSiHCl_2$, or $MeSiHBr_2$. The halosilane by-products from polysilane reactants may include both $R_3SiX$ and $R_2SiX_2$.

The halosilane by-product may also be used as a solvent for the synthesis process. The $Me_3SiX$ halosilane by-products have a low boiling point, making subsequent removal easy (i.e., 57° C. for $Me_3SiCl$ and 79° C. for $Me_3SiBr$).

Applicants have surprisingly discovered that the halosilane by-product may help lower the amount of impurities in the final $WCl_5$ product. The halosilane by-product is water reactive and acts as a self-drying solvent, which keeps the reaction media moisture free. In addition, the halosilane by-product reacts and removes any tungsten oxyhalides. Applicants further believe that the $Me_3SiX$ halosilane by-product may scavenge some of the elemental impurities. As shown in the Examples that follow, the disilane reaction produces higher purity $WX_5$ products than the olefin reaction.

The mixture is stirred for approximately 10 min to approximately 48 hours at a temperature range of approximately 10° C. to approximately the boiling point of the halosilane by-product, preferably from approximately 10° C. to approximately 50° C., and more preferably at approximately room temperature. The reaction mixture is stirred using a stirrer and at a speed sufficient to maintain any solid reactant or product in suspension. For larger batches, a double bladed stirrer may be required to maintain the solid reactants in suspension. The mixture produced comprises tungsten (IV) halide, tungsten (V) halide, unreacted Tungsten (VI) halide, all suspended in the halosilane by-product in liquid form, and possible impurities.

The concentration of the disilane or polysilane in the halosilane by-product may be monitored to monitor progress of the reaction. The reaction is complete when all of the disilane or polysilane reactant is consumed.

When the disilane or polysilane and halosilane by-product are both liquids, such as $Si_2Me_6$ and $Me_3SiX$, the process does not require the use of a solvent. More particularly, $WX_5$ may be synthesized without the use of any hydrocarbons or chloroalkanes, further minimizing potential sources of contaminants or additional hazardous materials, like volatile organic compounds or carcinogens.

After reaction, the reaction product may be isolated from the mixture by evaporating the halosilane by-product. The mixture may be stirred in vacuo. The mixture may also be warmed to temperatures ranging from approximately 30° C. to below the melting point of the tungsten chlorides. In another alternative, the mixture may be stirred in vacuo and warmed. The resulting solid product is a mixture of the $WCl_5$ with any unreacted $WCl_6$ and overreacted $WCl_4$.

Alternatively, the reaction mixture may be filtered to remove the halosilane by-products and impurities. Typical filters include glass or polymer frit filters. Larger scale filtering processes use polymer filter bags, such as those sold by Rosedale Products, Inc. or Pall Corp. Tungsten (V) halide may then be purified by successive washings with a rinse solvent and dried by vacuo. The halosilane by-product may be used as the rinse solvent. Once again, the rinse solvent must be dry (anhydrous) in order to prevent the formation of oxygenated species, such as tungsten oxides or oxyhalides. The rinse solvent may contain between approximately zero ppm and approximately 100 ppm moisture. Preferably, the rinse solvent contains between approximately zero ppm and approximately 10 ppm moisture.

In another alternative, the reaction mixture may be filtered to remove the halosilane by-product and impurities and rinsed, as above, followed by vacuum evaporation of any remaining volatiles components.

Applicants have surprisingly discovered that the silane reaction produces a high quantity of $WX_5$ in the isolated $WX_5$-containing composition. More particularly, the isolated $WX_5$-containing composition comprises between approximately 85% w/w to approximately 100% w/w $WX_5$, preferably between approximately 90% w/w and approximately 100% w/w $WX_5$, and more preferably between approximately 95% w/w and approximately 100% $WX_5$. This is surprising because Traven et al. disclose a similar process that quickly converts $WCl_6$ to $WCl_4$. Izvestiya Akademii Nauk SSR, Seriya Khimicheskaya (1975) 7, p. 1681 (32% conversion after 5 minutes). One of ordinary skill in the art having Traven et al. before them would not expect the change in stoichiometry and solvent to produce high yields of the $1^{st}$ reduction product, $WX_5$.

The Tungsten (V) halide reaction product from either synthesis process may be further purified by sublimation under reduced pressure at temperatures below the melting point of the desired product. For example, $WCl_5$ may be purified by sublimation under vacuum at temperatures below approximately 248° C., and more preferably below approximately 220° C. Unreacted Tungsten (VI) halide, overreduced tungsten (IV) halide, and other impurities may be removed by sublimation.

The purified Tungsten (V) halide has a purity ranging from approximately 96% mol/mol to approximately 100% mol/mol, preferably from approximately 98% mol/mol to approximately 100% mol/mol. The purified Tungsten (V) halide preferably has between the detection limit and 100 ppb of each potential metal contaminant (e.g., at least Al, Ca, Cr, Cu, Fe, Mg, Ni, K, Na, Ti, Zn, etc.). Suitable sublimation methods include fractional sublimation. The fractional sublimation may be performed at high temperatures and subatmospheric pressure.

As shown in the following Examples, Applicants have surprisingly discovered that the impurity profile from the disilane synthesis is very low. More particularly, prior to sublimation, the $WCl_5$ reaction product contains less than 150 ppbw of Al, Ca, and Tl; less than 1000 ppbw of Li, Mn, and Zn; less than 10,000 ppbw Cr, Mo, and Na; and less than 20,000 ppbw Fe. Sublimation further reduces the impurities to less than 150 ppbw for Al, Ca, Cr, Fe, Li, Mn, Na, Tl, and Zn and less than 200 ppbw Mo.

In contrast, even after sublimation, the amount of Cr, Fe, Mo, Na, and Zn remaining in the $WCl_5$ produced by the olefin method remains between approximately 100 ppbw to approximately 6000 ppbw.

One of ordinary skill in the art will recognize the sources for the components of the systems used to practice the disclosed methods. Preferably the components are made of corrosion resistant materials, including but not limited to glass, glass or polymer coated stainless steel, fluoropolymers such as perfluoroalkoxy alkane (PFA) and polytetrafluoroethylene (PTFE), etc.

The product may be analyzed by Ultraviolet-Visible (UV-VIS) spectroscopy, Fourier Transform InfraRed (FTIR) spectroscopy, ThermoGravimetric Analysis-Differential Thermal Analysis (TGA-DTA), Differential Scanning Calorimetry (DSC), X-Ray Diffraction (XRD), X-Ray Photoelectron Spectroscopy (XPS), Scanning Electron Microscopy (SEM), elemental analysis, and other analytical technique In the examples that follow, the purity of the $WX_5$-containing composition was determined using TGA-DTA. One of ordinary skill in the art will recognize that TGA is just one of many analysis techniques that may be utilized to determine purity. Applicants have further determined that aluminum pans are not suitable for TGA analysis of the $WX_5$-containing composition. Instead, alumina pans were used for all TGA analysis (i.e., alumina=aluminum oxide).

TGA is a thermal analysis technique which measures the amount and rate of change in the weight of a material as a function of temperature or time in a controlled atmosphere. DTA measures the temperature differences between a sample and inert reference undergoing identical thermal cycles. DSC is similar to DTA and measures the difference in the amount of heat required to increase the temperature of a sample and a reference as a function of temperature. These thermal analytical techniques may identify characteristic melting and sublimation points, phase transitions and decompositions. TGA measurements are also used to predict thermal stability up to elevated temperatures and to determine the composition of materials by studying the loss of solvents and/or volatile compounds for example; species or impurities contained in the sample are released during the weight loss event in the TGA. TGA curves may also show the presence of impurities.

Figure 2:
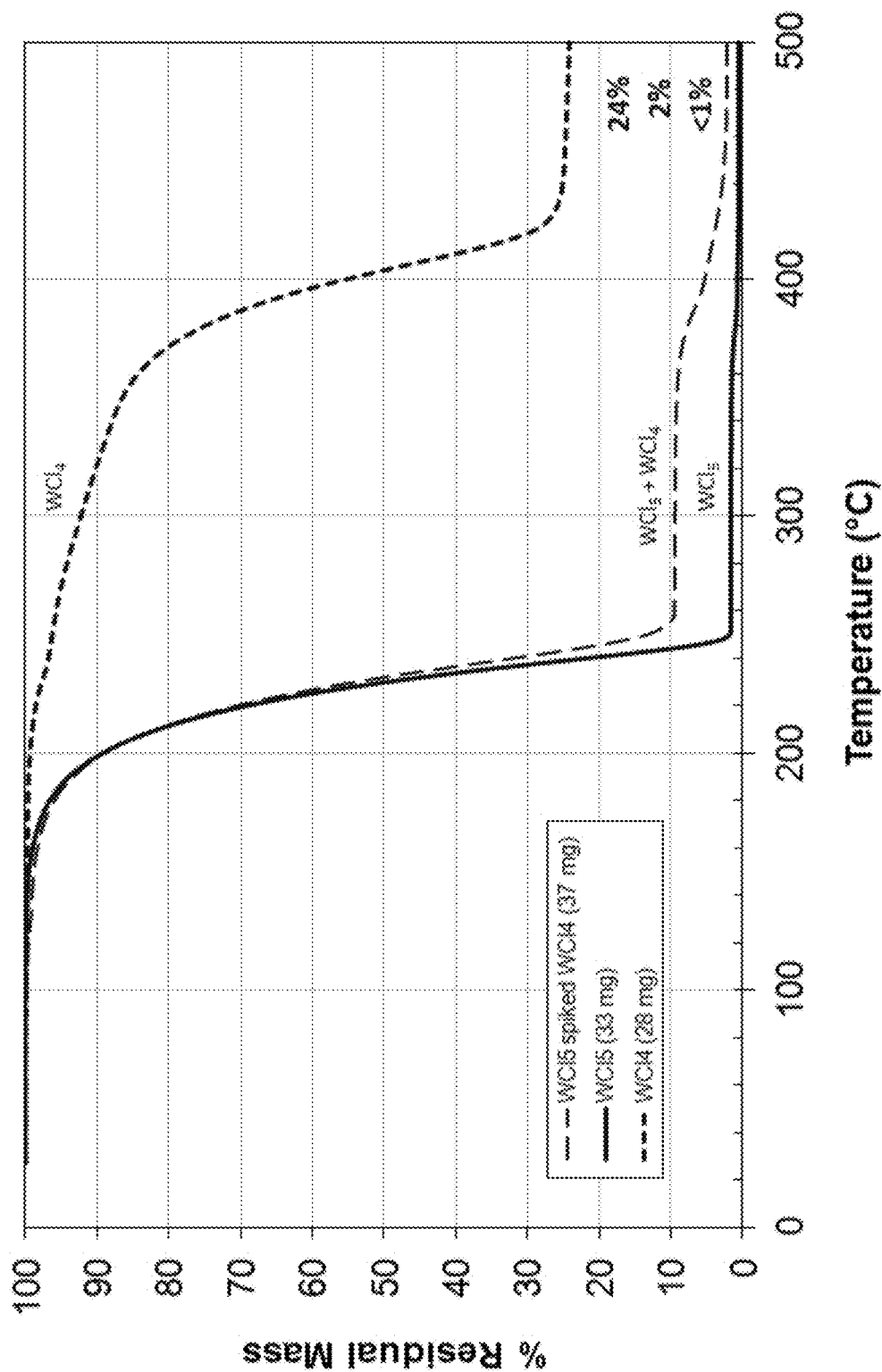
FIG. 2 is a ThermoGravimetric Analysis (TGA) plot illustrating the percentage of weight loss upon temperature increase of $WCl_4$, $WCl_5$, and a controlled mixture of the two.

FIG. 2 is a TGA plot illustrating the percentage of weight loss upon temperature increase of $WCl_4$, $WCl_5$, and a controlled mixture of the two. As shown in FIG. 2, the presence of $WCl_4$ in $WCl_5$ caused a step feature ranging from approximately 250° C. to approximately 390° C. and an increase in the total amount of residue. The differences in the TGA curves may be quantified by weight loss measurements, comparison with mass loss of pure standards (e.g. $WCl_4$, $WCl_6$), or using TGA derivatives. Derivative TGA curves are useful to distinguish overlapped mass loss events, to identify a trend and maximum rate of mass loss processes, and also to identify a small mass loss steps. Thus, application of first (DTG), second (2DTG), and third (3DTG) derivatives of the TGA curves allows monitoring and identification of small amounts of impurities in tungsten halides producing strongly overlapped features on the TGA curves. Using this simple and rapid technique, data from TGA/DTA can be used to identify qualitatively and to determine quantitatively the amount of common impurities in tungsten chlorides including but not limited to $WCl_4$, $WCl_5$, and $WCl_6$.

The weight loss measurement in the region specific to the impurity may be quantified. The size and position of any feature (dip or step) on the TGA trace due to the presence of the impurity maybe measured and correlated to the amount of the impurity (%) in the sample. The weight loss for analyzed samples may be compared with that of a standard (e.g. pure $WCl_4$, $WCl_6$), and the concentration of $WCl_4$, $WCl_6$, and other impurities established by application of any available mathematical method.

FIG. 1 is a diagram of an exemplary system suitable to perform the disclosed methods. One of ordinary skill in the art will recognize that additional components may be included without departing from the teachings herein. More particularly, the reactor 10 may include any monitors needed to monitor the reaction, such as pressure, temperature, etc. Air may be removed from various parts of the system (e.g., reactor 10) by an inert gas 2, such as nitrogen, argon, etc. The inert gas 2 may also serve to pressurize the solvent stored in vessel 5, rinse solvent stored in vessel 3, and/or olefin or disilane stored in vessel 4 to permit its delivery to reactor 10. One of ordinary skill in the art will recognize that only vessel 3 or 5 will be needed when the solvent and rinse solvent are the same.

The reactor 10 is maintained at the desired temperature by a jacket 11. The jacket 11 has an inlet 21 and an outlet 22. Inlet 21 and outlet 22 may be connected to a heat exchanger/chiller 23 and/or pump (not shown) to provide recirculation of the cooling fluid. Nitrogen, refrigerated ethanol, an acetone/dry ice mixture, silicone oils, or other heat transfer agents such as monoethylene glycol (MEG) may be used to cool various parts of the system (e.g., jacket 11). The cooling medium (not shown) in jacket 11 may also be replaced by a heating medium (not shown) when needed, for example, to evaporate the solvent and isolate the reaction product. One of ordinary skill in the art will recognize that "replacement" of the cooling medium will not be necessary if the cooling medium is also capable of acting as a heating medium (e.g., MEG). Instead, the temperature of the medium may be changed via, for example, heat exchanger. The temperature is monitored with a probe 29.

One of ordinary skill in the art will recognize that the jacket 11 may not require inlet 21 and outlet 22 If the batch size is small enough and the mixing time short enough because the thermal fluid may maintain its temperature for the duration of the reaction. Alternatively, the jacket 11 may not be required if the batch size is small enough and the mixing time long enough because heat may be vented to the atmospheric environment during the reaction. In another alternative, the temperature of the reactor 10 may be maintained using a cold finger, cooling foil, or other temperature control mechanisms in addition to or replacing the jacket 11.

The reactants (solvent stored in vessel 5, Tungsten (VI) halide stored in vessel 1, and olefin/disilane stored in vessel 4) are added to reactor 10 via lines 6, 7, and 8, respectively. One of ordinary skill in the art will recognize that solid reactants may alternatively be added to the reactor 10 using addition funnels or other solid movement tools. One of ordinary skill in the art will further recognize that lines 6, 7, and/or 8 may further comprise additional equipment that adds the reactants and/or solvents to the vessel 10 in a controllable manner, such as gauges, glass addition funnels, calibrated follow meters, piston metering pumps, etc.

The reactants may be mixed in the reactor by an agitator 12 turned by motor 13 to form mixture 14. The mixing is performed under an inert atmosphere at approximately atmospheric pressure. After suitable mixing, the mixture 14 may be stirred in vacuo to remove the volatiles which are trapped in cold trap 27 connected to a vacuum pump 28. Once the volatiles are evaporated, the solid products may be removed from the reactor 10 under inert atmosphere prior to performance of the next process steps.

Instead of evaporation in vacuo, the mixture 14 may be removed from reactor 10 via drain 15 through a container 18 connected to a filter 17. In this embodiment, reactor 10 will most likely be located above filter 17 to best use the benefits of gravity. The inert gas 2 may be used to help move the mixture 14 into the drain 15. Alternatively, the mixture 14 may be removed from the reactor 10 using any slurry movement tools, such as a slurry pump (not shown), to move the mixture 14 into the filter 17. As the tungsten halide (not shown) is suspended in the mixture 14, clogging of the reactor 10 is not a problem. The rinse solvent stored in vessel 3 can be added to the reactor 10 via line 9 after the filtration process in order to remove residual products, by-products, and/or impurities.

The solid product will be collected in container 16, such as a glass bottle, and transported to a new location prior to performance of the next process steps. Alternatively, the mixture may immediately be directed to a pot 19, without passing though the filter 17.

Once again, vessel 18 may be transported to a new location prior to performance of the next process steps. The product may be transferred from vessel 18 to a sublimator (not shown) for further purification.

One of ordinary skill in the art will recognize that the exemplary system may include many additional elements that are not described in order to provide a simplified view of the system. For example, one of ordinary skill in the art will recognize that the gases may be introduced into the reactor through a pressure valve and mass flow controller. Additionally, one of ordinary skill in the art will recognize that additional valves, pumps, and flow controllers may be located at various other locations without departing from the teachings herein.

EXAMPLES

The following non-limiting examples are provided to further illustrate embodiments of the invention. However, the examples are not intended to be all inclusive and are not intended to limit the scope of the inventions described herein.

Example 1. Synthesis of Tungsten Pentachloride from Hexamethyldisilane 4900 g $WCl_6$ and 12 kg of trimethylsilyl chloride (TMS-Cl) were charged into a 22 L reactor and the mixture was stirred at 150 rpm. With external cooling, hexamethyldisilane (HMDS) 870 g was added slowly over a period of 3.5 hrs, during which the reaction mixture temperature increased from room temperature to about 50° C. The mixture was stirred for another 1.5 hrs to allow cooling below 35° C. The mixture was then filtered and the collected solid was washed with 3 Kg of TMS-Cl, followed by solvent removal and drying under vacuum. The solid $WCl_5$ product was purified using sublimation.

The purity of the reaction product was assessed by thermogravimetric analysis (TGA). A typical pure tungsten (V) pentachloride displays a smooth evaporation with a step feature of 1-2% and a residue of <1%. An increase of the step feature indicates an overreduction to tungsten (IV) tetrachloride. The absence of the step shows the presence of unreacted tungsten (VI) hexachloride. A right shift of the overall evaporation curve can also be associated with the presence of tungsten (VI) hexachloride at high levels.

Figure 3:
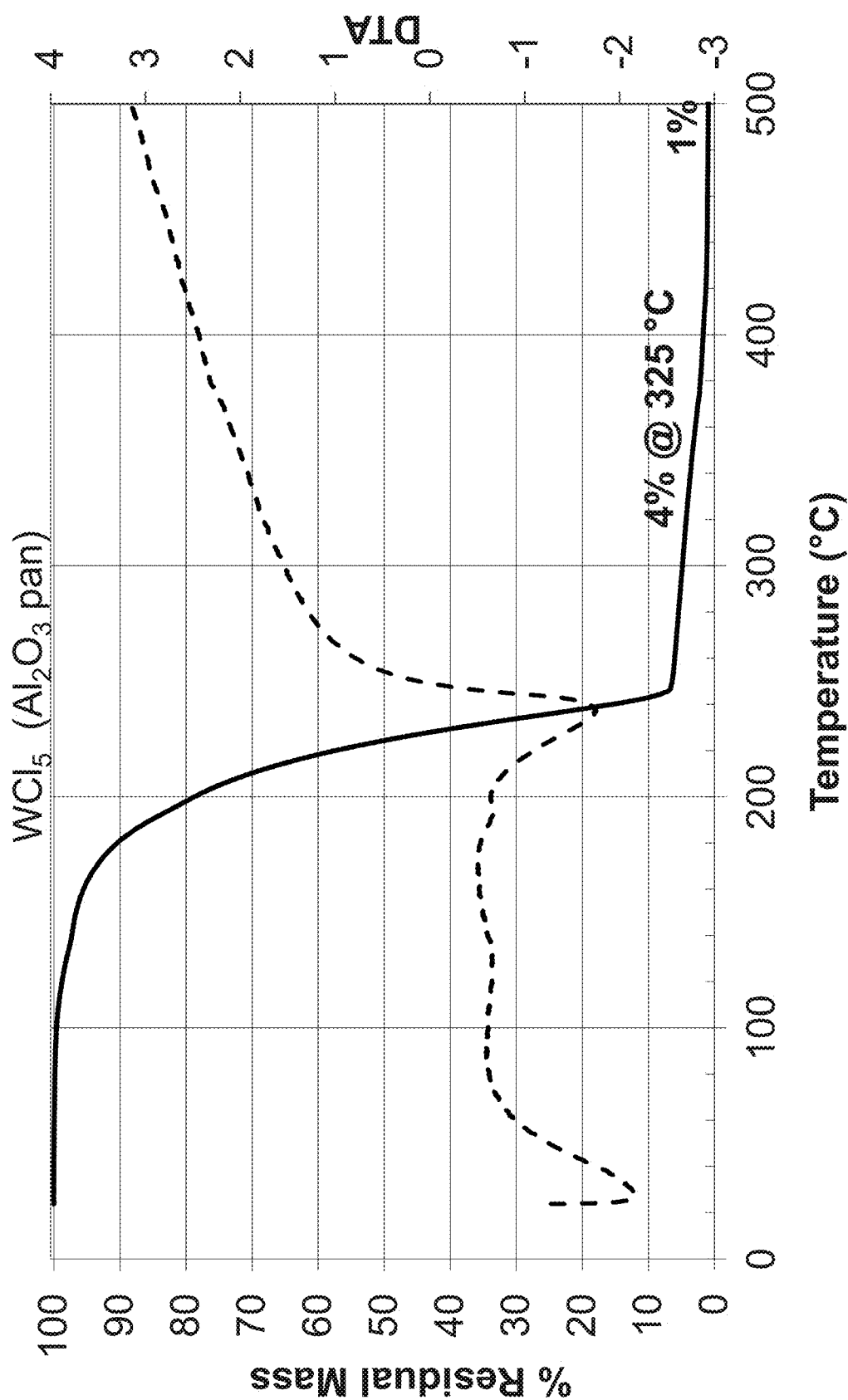
FIG. 3 is a ThermoGravimetric Analysis/Differential Thermal Analysis (TGA/DTA) plot illustrating the percentage of weight loss (TGA) or the differential temperature (DTA) upon temperature increase of the $WCl_5$ product of Example 1 before sublimation.

FIG. 3 is the ThermoGravimetric Analysis/Differential Thermal Analysis (TGA/DTA) plot illustrating the percentage of weight loss (TGA) or the differential temperature (DTA) upon temperature increase of the $WCl_5$ product before sublimation. The amount of residue of the step (4%) shows the presence of overreduced tungsten (IV) tetrachloride. The step shows that there is little to no tungsten (VI) hexachloride. As a result, approximately 96% $WCl_5$ was formed by this reaction.

Figure 4:
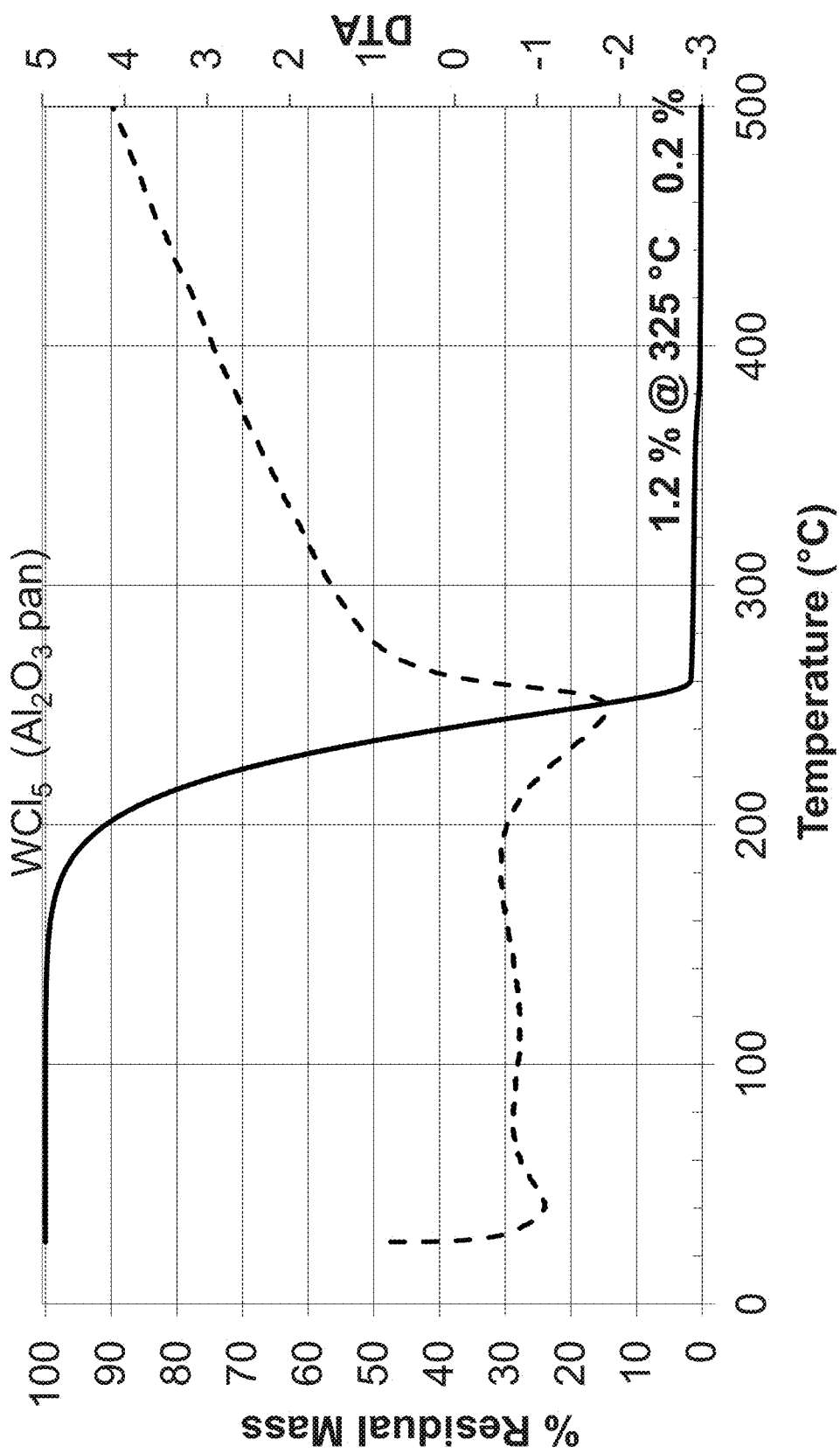
FIG. 4 is a TGA/DTA plot illustrating the percentage of weight loss (TGA) or the differential temperature (DTA) upon temperature increase of the $WCl_5$ product of Example 1 after sublimation.

FIG. 4 is a TGA/DTA plot illustrating the percentage of weight loss (TGA) or the differential temperature (DTA) upon temperature increase of the $WCl_5$ product after sublimation. The amount of residue of the step (1.2%) shows that the overreduced tungsten (IV) tetrachloride has been significantly reduced by sublimation. As a result, approximately 99% $WCl_5$ was obtained after sublimation.

Sublimation of the reaction product may be used to further purify the $WCl_5$ product.

Example 2. Impurity Profile from Disilane Reaction $WCl_5$ samples were obtained from Example 1 before and after sublimation. The hydrolyzed $WCl_5$ samples were directly injected for ionization in a nebulizer in an Inductively Coupled Plasma Mass Spectrometer (ICP-MS). The results were as follows:

| Metals (in ppbw) | Pre-sublimation | Post sublimation |
| --- | --- | --- |
| Al | 100 | ND |
| Sb | ND | ND |
| As | ND | ND |
| Ba | ND | ND |
| Be | ND | ND |
| Cd | ND | ND |
| Ca | 64 | ND |
| Cr | 2500 | ND |
| Co | ND | ND |
| Cu | ND | ND |
| Ga | ND | ND |
| Ge | ND | ND |
| In | ND | ND |
| Fe | 18000 | ND |
| Pb | ND | ND |
| Li | 240 | ND |
| Mg | 87 | ND |
| Mn | 720 | ND |
| Mo | 2200 | 190 |
| Ni | ND | ND |
| Nb | ND | ND |
| K | ND | ND |
| Ag | ND | ND |
| Na | 1300 | ND |
| Sr | ND | ND |
| Tl | 56 | ND |
| Sn | ND | ND |
| Ti | ND | ND |
| V | ND | ND |
| Zn | 220 | ND |
| Zr | ND | ND |

ND = None detected, Detector limit is below 50 ppbw.

Example 3

Additional $WCl_5$ products were obtained from the disilane reactions after sublimation. The hydrolyzed $WCl_5$ samples were directly injected for ionization in a nebulizer in an ICP-MS. The results were as follows:

| Metals (in ppbw) | Batch 1 | Batch 2 | Batch 3 | Batch 4 | Batch 5 | Batch 6 | Batch 7 | Batch 8 | Batch 9 |
| --- | --- | --- | --- | --- | --- | --- | --- | --- | --- |
| Al | ND | ND | ND | ND | ND | 130 | 63 | ND | ND |
| Sb | ND | ND | ND | ND | ND | ND | ND | ND | ND |
| As | ND | ND | ND | ND | ND | ND | ND | ND | ND |
| Ba | ND | ND | ND | ND | ND | ND | ND | ND | ND |
| Be | ND | ND | ND | ND | ND | ND | ND | ND | ND |
| Cd | ND | ND | ND | ND | ND | ND | ND | ND | ND |
| Ca | ND | ND | ND | ND | ND | ND | ND | ND | ND |
| Cr | ND | 51 | ND | ND | ND | ND | ND | ND | ND |
| Co | ND | ND | ND | ND | ND | ND | ND | ND | ND |
| Cu | ND | ND | ND | ND | ND | ND | ND | ND | ND |
| Ga | ND | ND | ND | ND | ND | ND | ND | ND | ND |
| Ge | ND | ND | ND | ND | ND | ND | ND | ND | ND |
| In | ND | ND | ND | ND | ND | ND | ND | ND | ND |
| Fe | ND | 120 | ND | ND | ND | ND | ND | ND | 71 |
| Pb | ND | ND | ND | ND | ND | ND | ND | ND | ND |
| Li | ND | ND | ND | ND | 78 | ND | ND | ND | ND |
| Mg | ND | ND | ND | ND | ND | ND | ND | ND | ND |
| Mn | ND | ND | ND | ND | ND | ND | ND | ND | ND |
| Mo | 190 | ND | 120 | 130 | ND | 75 | 130 | 140 | 96 |
| Ni | ND | ND | ND | ND | ND | ND | ND | ND | ND |
| Nb | ND | ND | ND | ND | ND | ND | ND | ND | ND |

-continued

| Metals (in ppbw) | Batch 1 | Batch 2 | Batch 3 | Batch 4 | Batch 5 | Batch 6 | Batch 7 | Batch 8 | Batch 9 |
|---|---|---|---|---|---|---|---|---|---|
| K | ND | ND | ND | ND | ND | ND | ND | ND | ND |
| Ag | ND | ND | ND | ND | ND | ND | ND | ND | ND |
| Na | ND | ND | ND | ND | ND | ND | ND | ND | ND |
| Sr | ND | ND | ND | ND | ND | ND | ND | ND | ND |
| Tl | ND | ND | ND | 78 | ND | ND | 51 | ND | ND |
| Sn | ND | ND | ND | ND | ND | ND | ND | ND | ND |
| Ti | ND | ND | ND | ND | ND | ND | ND | ND | ND |
| V | ND | ND | ND | ND | ND | ND | ND | ND | ND |
| Zn | ND | ND | ND | ND | ND | ND | ND | ND | ND |
| Zr | ND | ND | ND | ND | ND | ND | ND | ND | ND |

ND = None detected, Detector limit is below 50 ppbw.

Example 4. Synthesis of Tungsten Pentachloride in 1-Chlorobutane with Stoichiometric Amounts of Cis/Trans-2-Pentene Under an inert atmosphere, a reaction flask is charged with tungsten (VI) hexachloride (2.48 g; 0.007 mol). 1-chlorobutane (20 mL; 17.5 g; 0.189 mol) and cis/trans-2-pentene (0.46 g; 0.007 mol) are added to the reaction flask. The reaction mixture is stirred under inert atmosphere for 3 hours. The reaction may stop upon exhaustion of the cis/trans-2-pentene reactant but was stopped in this example by removing all volatiles under vacuum.

Figure 5:
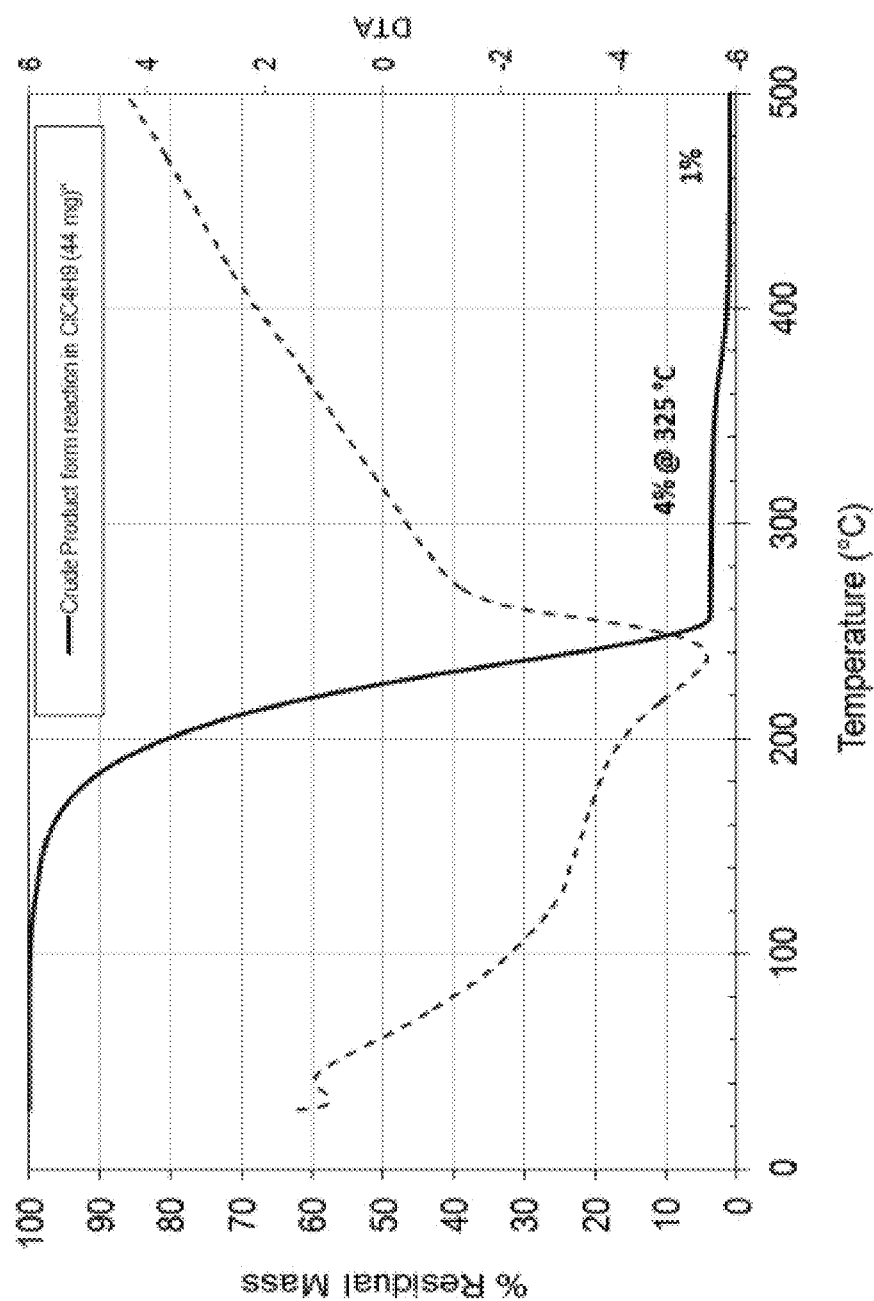
FIG. 5 is a TGA/DTA plot illustrating the percentage of weight loss (TGA) or the differential temperature (DTA) upon temperature increase of the $WCl_5$ product of Example 4.

FIG. 5 is a TGA/DTA plot of the product of Example 4. The amount of residue of the step (4%) shows the presence of overreduced tungsten (IV) tetrachloride. These results demonstrate a smaller step as compared to those in the following comparative examples, showing the improved purity of crude tungsten (V) pentachloride using a stoichiometric amount of reactants and an aliphatic halohydrocarbon solvent. Sublimation of the reaction product may be used to further purify the WCl$_5$ product.

Example 5. Synthesis of Tungsten Pentachloride in Dichloromethane with Close to Stoichiometric Amounts of Cis/Trans Pentene Under inert atmosphere, a reaction flask is charged with tungsten (VI) hexachloride (9.9 g; 0.025 mol). Anhydrous CH$_2$Cl$_2$ (80 mL; 105 g; 1.5 mol) and cis/trans-2-pentene (1.84 g; 0.026 mol) are added to the reaction flask. The reaction mixture is stirred under inert atmosphere for 30 minutes. The reaction is stopped by removal of all volatiles under vacuum.

Figure 6:
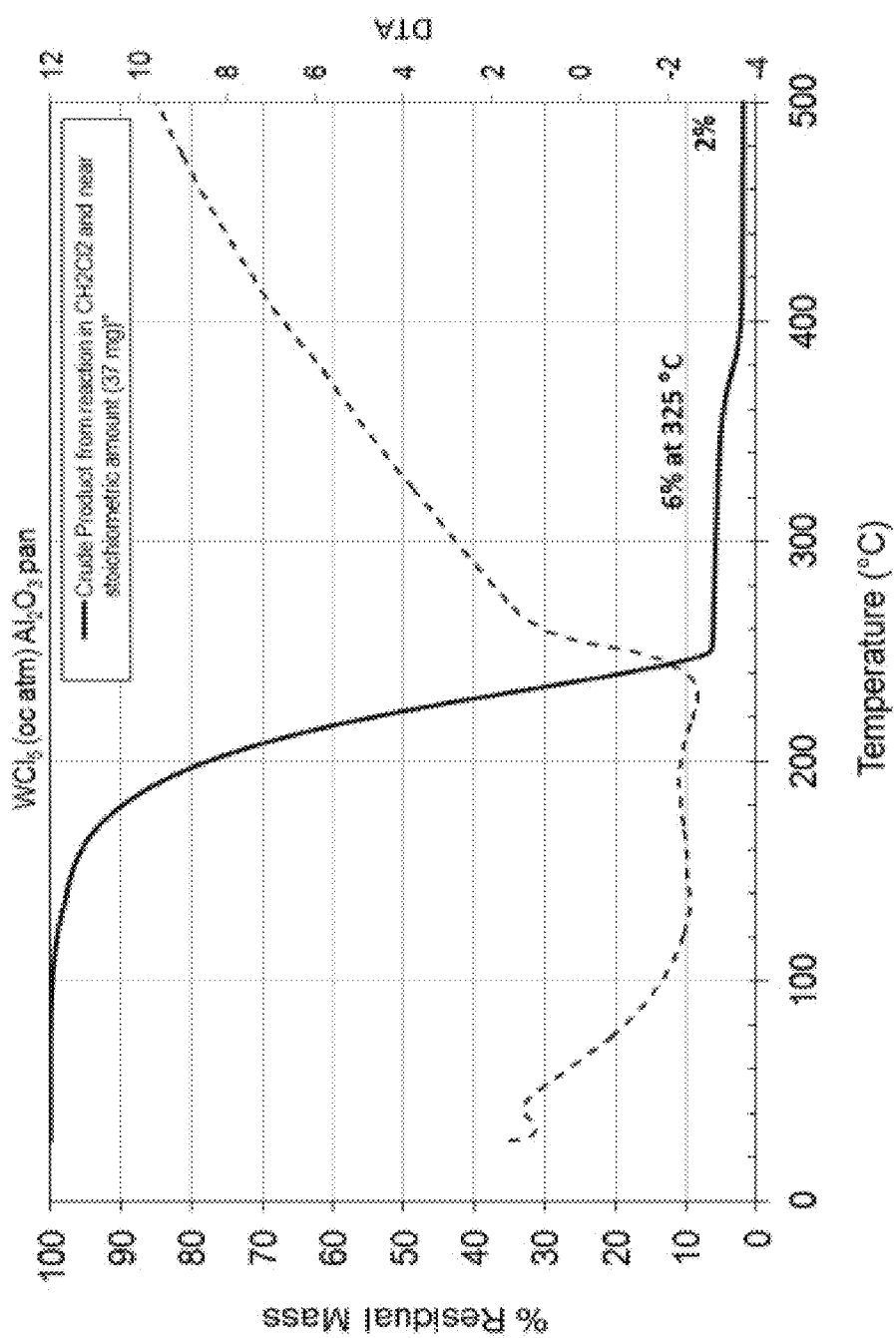
FIG. 6 is a TGA/DTA plot illustrating the percentage of weight loss (TGA) or the differential temperature (DTA) upon temperature increase of the $WCl_5$ product of Example 5.

FIG. 6 is a TGA/DTA plot of the product of Example 5. The amount of residue of the step (6%) shows the presence of over-reduced tungsten (IV) tetrachloride.

Example 6. Olefin Synthesis Impurity Profile

WCl$_5$ samples were obtained from Example 5 after sublimation. The hydrolyzed WCl$_5$ samples were directly injected for ionization in a nebulizer in an ICP-MS. The results were as follows:

| Metals (in ppbw) | Batch 1 | Batch 2 | Batch 3 | Batch 4 | Batch 5 | Batch 6 | Batch 7 |
|---|---|---|---|---|---|---|---|
| Al | 1000 | ND | 210 | ND | ND | 150 | 100 |
| Sb | ND | ND | ND | ND | ND | ND | ND |
| As | ND | ND | ND | 270 | 110 | ND | ND |
| Ba | ND | ND | ND | ND | ND | ND | ND |
| Be | ND | ND | ND | ND | ND | ND | ND |
| Cd | ND | ND | ND | ND | ND | ND | ND |
| Ca | 160 | ND | 1800 | ND | ND | 380 | 220 |
| Cr | 210 | ND | ND | ND | ND | ND | ND |
| Co | ND | ND | ND | ND | ND | ND | ND |
| Cu | ND | ND | ND | ND | ND | ND | ND |
| Ga | ND | ND | ND | ND | ND | ND | ND |
| Ge | ND | ND | ND | ND | ND | ND | ND |
| In | ND | ND | ND | ND | ND | ND | ND |
| Fe | 5100 | 2000 | 1500 | ND | ND | 380 | 150 |
| Pb | ND | ND | ND | ND | ND | ND | 230 |
| Li | ND | ND | ND | ND | ND | ND | ND |
| Mg | 260 | ND | ND | ND | ND | ND | ND |
| Mn | ND | ND | ND | ND | ND | ND | ND |
| Mo | ND | ND | ND | ND | ND | ND | ND |
| Ni | 200 | ND | ND | ND | ND | ND | ND |
| Nb | 180 | 210 | ND | ND | ND | ND | ND |
| K | 310 | ND | ND | 1100 | 970 | 78 | 97 |
| Ag | ND | ND | ND | ND | ND | ND | ND |
| Na | 730 | ND | ND | ND | ND | ND | ND |
| Sr | ND | ND | ND | 130 | 120 | ND | ND |
| Tl | ND | 78 | ND | ND | ND | 91 | 74 |
| Sn | ND | ND | ND | ND | ND | ND | ND |
| Ti | ND | ND | ND | ND | ND | ND | ND |
| V | 61 | ND | ND | ND | ND | ND | ND |
| Zn | ND | ND | ND | ND | ND | 3500 | ND |
| Zr | ND | ND | ND | ND | ND | ND | ND |

ND = None detected, Detector limit is below 50 ppbw.

As can be seen from the comparison of Examples 2, 3, and 6, the WCl$_5$ disilane synthesis produces significantly less impurities than the WCl$_5$ olefin synthesis.

Comparative Example 1. Synthesis of Tungsten Pentachloride in Pentane with Excess of Cis/Trans Pentene Under inert atmosphere, a reaction flask is charged with tungsten (VI) hexachloride (4.96 g; 0.013 mol). Anhydrous pentane (40 mL; 25 g; 0.35 mol) and cis/trans-2-pentene (2.10 g; 0.030 mol) are added to the reaction flask. The reaction mixture is stirred under inert atmosphere for 15 hours. The reaction is stopped by removal of all volatiles under vacuum.

Figure 7:
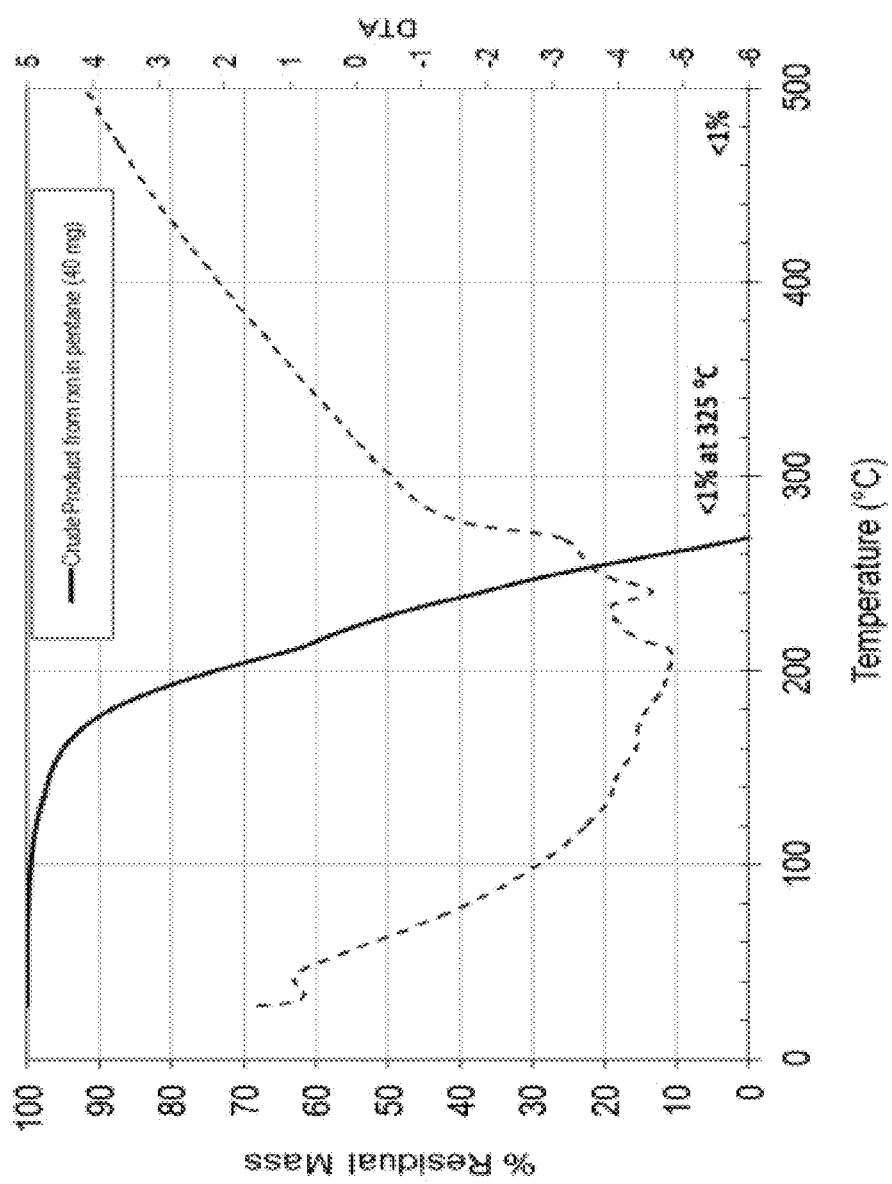
FIG. 7 is a TGA/DTA plot illustrating the percentage of weight loss (TGA) or the differential temperature (DTA) upon temperature increase of the product of Comparative Example 1.

FIG. 7 is a TGA/DTA plot of the product of Comparative Example 1. The absence of the step shows the presence of unreacted tungsten (VI) hexachloride along with a non-smooth evaporation seen by the right shift at the bottom half of the curve. This comparative example demonstrates that the aliphatic halohydrocarbon of Examples 1 and 2 yields a larger quantity of the desired product than reactions using hydrocarbons.

Comparative Example 2. Synthesis of Tungsten Pentachloride in Dichloromethane with Excess of Cis/Trans Pentene Under inert atmosphere, a reaction flask is charged with tungsten (VI) hexachloride (9.9 g; 0.025 mol). Anhydrous $CH_2Cl_2$ (80 mL; 105 g; 1.5 mol) and cis/trans-2-pentene (17.5 g; 0.25 mol) are added to the reaction flask. The reaction mixture is stirred under inert atmosphere for 30 minutes. The reaction is stopped by removal of all volatiles under vacuum.

Figure 8:
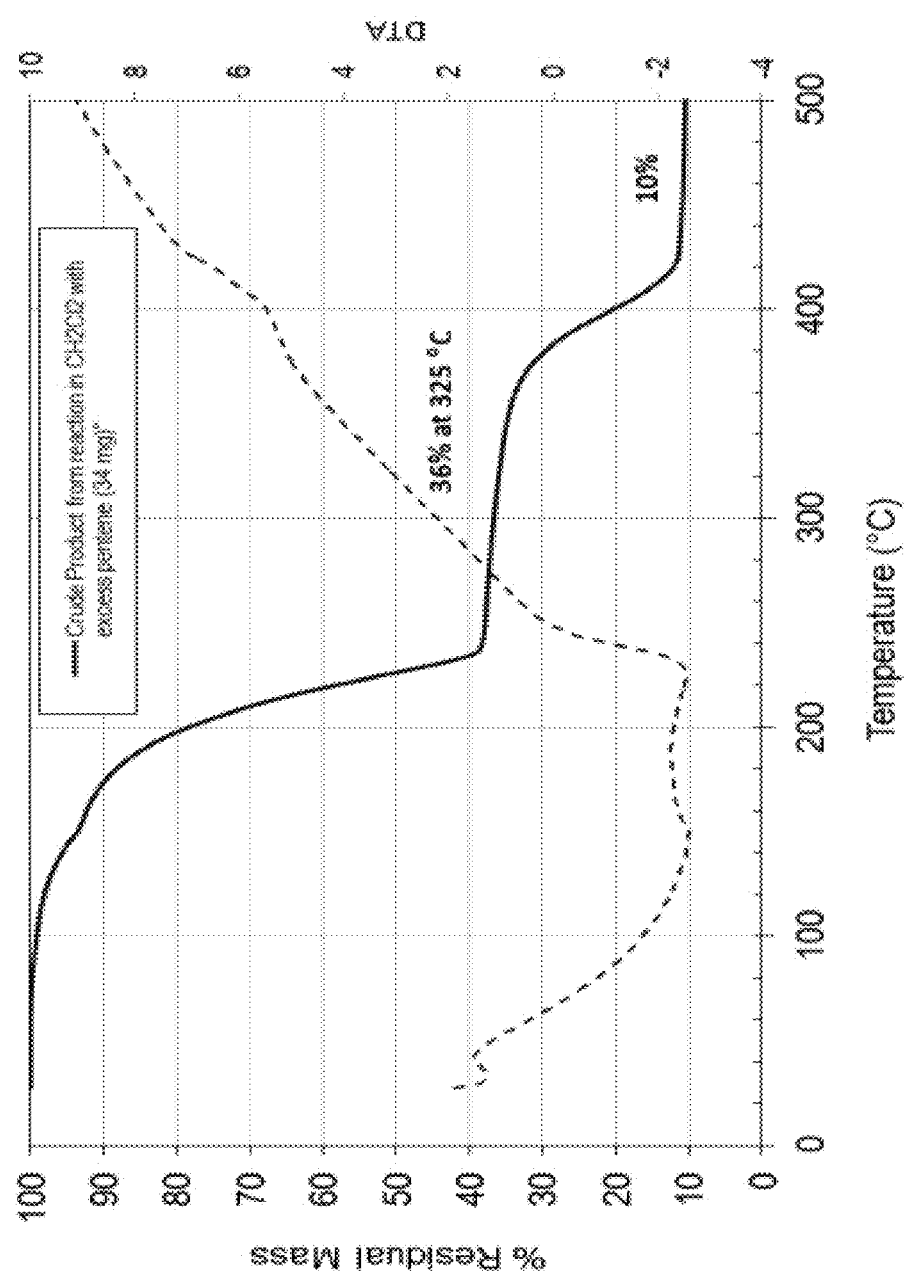
FIG. 8 is a TGA/DTA plot illustrating the percentage of weight loss (TGA) or the differential temperature (DTA) upon temperature increase of the product of Comparative Example 2.

FIG. 8 is a TGA/DTA plot of the product of Comparative Example 2. The increased presence of the step (36%) shows the presence of over-reduced tungsten (IV) tetrachloride along with an increased residue. This comparative example demonstrates that a stoichiometric excess of olefin rapidly drives the reaction past the desired $WCl_5$ product to the lower oxidation state $WCl_4$.

While embodiments of this invention have been shown and described, modifications thereof may be made by one skilled in the art without departing from the spirit or teaching of this invention. The embodiments described herein are exemplary only and not limiting. Many variations and modifications of the composition and method are possible and within the scope of the invention. Accordingly the scope of protection is not limited to the embodiments described herein, but is only limited by the claims which follow, the scope of which shall include all equivalents of the subject matter of the claims.

What is claimed is:

1. A method of synthesizing a $WX_5$-containing composition, wherein X is Cl or Br, the method comprising reacting approximately 1 molar equivalent of a tungsten hexahalide with approximately 0.4 to approximately 0.6 molar equivalents of a disilane to form a reaction mixture containing tungsten pentahalide and a halosilane by-product.

2. The method of claim 1, wherein the tungsten pentahalide is $WCl_5$.

3. The method of claim 1, wherein the disilane has the formula $Si_2R_6$, with each R independently being H, a C1-C4 hydrocarbyl group, or a halide.

4. The method of claim 3, wherein the disilane is $Si_2Me_6$.

5. The method of claim 1, further comprising adding the tungsten hexahalide to a solvent having the formula $R_3SiX$, with X as defined above in claim 1 and each R independently being H, a C1-C4 hydrocarbyl group, or a halide, to form a suspension prior to the reacting step.

6. The method of claim 5, wherein the reacting step occurs when the disilane is added to the suspension.

7. The method of claim 1, further comprising isolating the tungsten pentahalide from the reaction mixture by evaporating the halosilane by-product to produce an isolated $WX_5$-containing composition.

8. The method of claim 7, wherein the isolated $WX_5$-containing composition comprises between approximately 95% w/w $WCl_5$ and approximately 100% $WCl_5$.

9. The method of claim 7, further comprising sublimating the isolated $WX_5$-containing composition to produce the $WX_5$-containing composition.

10. The method of claim 9, wherein the $WX_5$-containing composition comprising between approximately 0% to approximately 0.00002% by weight (0-200 ppb) of each of Al, Ti, V, Cr, Fe, Ni, Cu, and Mo.

11. The method of claim 1, further comprising isolating the tungsten pentahalide from the reaction mixture by filtration to produce an isolated $WX_5$-containing composition.

12. The method of claim 11, wherein the isolated $WX_5$-containing composition comprises between approximately 95% w/w $WCl_5$ and approximately 100% $WCl_5$.

13. The method of claim 11, further comprising sublimating the isolated $WX_5$-containing composition to produce the $WX_5$-containing composition.

14. The method of claim 13, wherein the $WX_5$-containing composition comprising between approximately 0% to approximately 0.00002% by weight (0-200 ppb) of each of Al, Ti, V, Cr, Fe, Ni, Cu, and Mo.

15. A method of synthesizing a $WCl_5$-containing composition, the method comprising reacting approximately 1 molar equivalent of tungsten hexachloride with approximately 0.4 to approximately 0.6 molar equivalents of a disilane to form a reaction mixture containing tungsten pentachloride and a chlorosilane by-product and isolating the tungsten pentachloride from the reaction mixture to produce an isolated $WCl_5$-containing composition comprising between approximately 95% w/w $WCl_5$ and approximately 100% $WCl_5$.

16. The method of claim 15, wherein the disilane is $Si_2Me_6$.

17. The method of claim 15, further comprising adding the tungsten hexachloride to a trimethylchlorosilane solvent to form a suspension prior to the reacting step.

18. The method of claim 15, further comprising sublimating the isolated $WCl_5$-containing composition to produce the $WCl_5$-containing composition comprising between approximately 0% to approximately 0.00002% by weight (0-200 ppb) of each of Al, Ti, V, Cr, Fe, Ni, Cu, and Mo.

* * * * *